(12) United States Patent
Nishii et al.

(10) Patent No.: US 9,201,861 B2
(45) Date of Patent: Dec. 1, 2015

(54) CHARACTER INPUT PREDICTION APPARATUS, CHARACTER INPUT PREDICTION METHOD, AND CHARACTER INPUT SYSTEM

(75) Inventors: Yoshimi Nishii, Kyoto (JP); Susumu Kobayashi, Kyoto (JP); Yoshihiro Ujiie, Osaka (JP); Masaki Yamauchi, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 438 days.

(21) Appl. No.: 13/643,161

(22) PCT Filed: Mar. 15, 2012

(86) PCT No.: PCT/JP2012/001826
§ 371 (c)(1),
(2), (4) Date: Oct. 24, 2012

(87) PCT Pub. No.: WO2012/132291
PCT Pub. Date: Oct. 4, 2012

(65) Prior Publication Data
US 2013/0038537 A1    Feb. 14, 2013

(30) Foreign Application Priority Data
Mar. 29, 2011   (JP) .................................. 2011-072586

(51) Int. Cl.
*G06F 3/02*       (2006.01)
*G06F 17/27*      (2006.01)
(Continued)

(52) U.S. Cl.
CPC .............. *G06F 17/276* (2013.01); *G06F 3/02* (2013.01); *G06F 3/0236* (2013.01);
(Continued)

(58) Field of Classification Search
USPC .................................. 345/168, 169, 172, 173
See application file for complete search history.

(56) References Cited

U.S. PATENT DOCUMENTS 6,002,390 A * 12/1999 Masui .......................... 345/173
7,020,270 B1    3/2006 Ghassabian
(Continued)

FOREIGN PATENT DOCUMENTS

| CN | 101266520 | 9/2008 |
|---|---|---|
| CN | 101539838 | 9/2009 |

(Continued)

OTHER PUBLICATIONS

International Search Report issued Jun. 12, 2012 in International (PCT) Application No. PCT/JP2012/001826.
(Continued)

*Primary Examiner* — Jason Olson
*Assistant Examiner* — Sosina Abebe
(74) *Attorney, Agent, or Firm* — Wenderoth, Lind & Ponack, L.L.P.

(57) ABSTRACT

A character input prediction apparatus includes: an operation input unit that obtains information of a character input operation by a user using a character key layout display which includes character keys; a dictionary storage unit that stores a dictionary including candidate character strings; an indication movement detection unit that detects an indication position and an indication direction respectively showing a position and a movement direction of the character input operation in the character key layout display, from the information of the character input operation; a filter generation unit that determines a character range located in the indication direction with the indication position as a base point, in the character key layout display; and a dictionary search unit that searches the dictionary for a predictive character string including any character included in the character range.

21 Claims, 40 Drawing Sheets

(51) Int. Cl.
  *G06F 3/023* (2006.01)
  *G06F 3/0488* (2013.01)
  *G06K 9/68* (2006.01)
  *G06F 3/041* (2006.01)

(52) U.S. Cl.
  CPC ............ *G06F 3/0237* (2013.01); *G06F 3/0238* (2013.01); *G06F 3/041* (2013.01); *G06F 3/0416* (2013.01); *G06F 3/04886* (2013.01); *G06K 9/6821* (2013.01); *G06K 2209/013* (2013.01); *H04M 2250/22* (2013.01)

(56) References Cited

U.S. PATENT DOCUMENTS

| | | | |
|---|---|---|---|
| 2004/0140956 A1* | 7/2004 | Kushler et al. | G06F 3/04886 345/168 |
| 2004/0169635 A1 | 9/2004 | Ghassabian | |
| 2005/0253814 A1 | 11/2005 | Ghassabian | |
| 2007/0079239 A1 | 4/2007 | Ghassabian | |
| 2007/0182595 A1 | 8/2007 | Ghassabian | |
| 2007/0188472 A1 | 8/2007 | Ghassabian | |
| 2008/0316183 A1* | 12/2008 | Westerman et al. | 345/173 |
| 2009/0037623 A1 | 2/2009 | Ghassabian | |
| 2009/0146848 A1 | 6/2009 | Ghassabian | |
| 2009/0199092 A1 | 8/2009 | Ghassabian | |
| 2011/0090151 A1 | 4/2011 | Huang et al. | |
| 2012/0326984 A1* | 12/2012 | Ghassabian | 345/168 |

FOREIGN PATENT DOCUMENTS

| | | |
|---|---|---|
| JP | 2002-014956 | 1/2002 |
| WO | 2007/114833 | 10/2007 |

OTHER PUBLICATIONS

Yoichiro Akiyama, "iPhone & iPod touch 2.0 Software—Study for East Asian Text Processing", Journal of Japan Association for East Asian Text Processing, the ninth issue, Oct. 1, 2008, p. 111-120, with partial English translation.

Chinese Office Action with Search Report issued Apr. 3, 2015 in corresponding Chinese Application No. 201280001393.7 (with partial English translation).

Li Pan et al., "Thumb Controlled Key Extraction Method of Virtual Keyboard for Touch-Screen Mobile," *Computer Systems & Applications*, vol. 19, No. 11, Nov. 30, 2010, pp. 229-233, with English abstract and partial English translation (Chapters 1, 3, and 4.1).

* cited by examiner

FIG. 4

| Character key layout | | | | |
|---|---|---|---|---|
| Character | Layout position | | | |
| | Start position | | End position | |
| | X-axis coordinate | Y-axis coordinate | X-axis coordinate | Y-axis coordinate |
| a | 1000 | 0 | 900 | 100 |
| i | 1000 | 100 | 900 | 200 |
| u | 1000 | 200 | 900 | 300 |
| e | 1000 | 300 | 900 | 400 |
| o | 1000 | 400 | 900 | 500 |
| ka | 900 | 0 | 800 | 100 |
| ki | 900 | 100 | 800 | 200 |
| ku | 900 | 200 | 800 | 300 |
| ke | 900 | 300 | 800 | 400 |
| ko | 900 | 400 | 800 | 500 |
| sa | 800 | 0 | 700 | 100 |
| ⋮ | | | | |
| so | 800 | 400 | 700 | 500 |
| ta | 700 | 0 | 600 | 100 |
| chi | 700 | 100 | 600 | 200 |
| tsu | 700 | 200 | 600 | 300 |
| te | 700 | 300 | 600 | 400 |
| to | 700 | 400 | 600 | 500 |
| na | 600 | 0 | 500 | 100 |
| ni | 600 | 100 | 500 | 200 |
| nu | 600 | 200 | 500 | 300 |
| ne | 600 | 300 | 500 | 400 |
| no | 600 | 400 | 500 | 500 |
| ha | 500 | 0 | 400 | 100 |
| ⋮ | | | | |
| ma | 400 | 0 | 300 | 100 |
| ⋮ | | | | |
| wa | 100 | 0 | 0 | 100 |
| wo | 100 | 100 | 0 | 200 |
| n | 100 | 200 | 0 | 300 |
| | | | | |
| — | 100 | 400 | 0 | 500 |

| 521 Indication position | |
|---|---|
| 531 — Coordinate Xb | Coordinate Yb — 532 |
| 800 | 300 |

FIG. 6

| Indication direction | Character range condition | |
|---|---|---|
| | (Start position) : (End position) | |
| Vertically up | (0, 0) : (1000, Coordinate Yb) | |
| Vertically down | (0, Coordinate Yb) : (1000, 500) | |
| Horizontally left | (0, 0) : (Coordinate Xb, 500) | |
| Horizontally right | (Coordinate Xb, 0) : (1000, 500) | |
| Diagonally up left | (0, 0) : (Coordinate Xb, Coordinate Yb) | |
| Diagonally down left | (0, Coordinate Yb) : (Coordinate Xb, 500) | |
| Diagonally up right | (Coordinate Xb, 0) : (1000, Coordinate Yb) | |
| Diagonally down right | (Coordinate Xb, Coordinate Yb) : (1000, 500) | |

FIG. 7

| Character key layout 301 | | | | |
|---|---|---|---|---|
| Character 302 341 | Layout position 303 | | | |
| | Start position 304 342 | | End position 351 305 352 | |
| | X-axis coordinate | Y-axis coordinate | X-axis coordinate | Y-axis coordinate |
| 1 | 0 | 0 | 100 | 100 |
| 2 | 100 | 0 | 200 | 100 |
| 3 | 200 | 0 | 300 | 100 |
| 4 | 300 | 0 | 400 | 100 |
| 5 | 400 | 0 | 500 | 100 |
| 6 | 500 | 0 | 600 | 100 |
| 7 | 600 | 0 | 700 | 100 |
| 8 | 700 | 0 | 800 | 100 |
| ⋮ | | | | |
| Q | 0 | 100 | 100 | 200 |
| W | 100 | 100 | 200 | 200 |
| E | 200 | 100 | 300 | 200 |
| R | 300 | 100 | 400 | 200 |
| T | 400 | 100 | 500 | 200 |
| Y | 500 | 100 | 600 | 200 |
| U | 600 | 100 | 700 | 200 |
| I | 700 | 100 | 800 | 200 |
| O | 800 | 100 | 900 | 200 |
| P | 900 | 100 | 1000 | 200 |
| A | 0 | 200 | 100 | 300 |
| S | 100 | 200 | 200 | 300 |
| ⋮ | | | | |
| M | 600 | 300 | 700 | 400 |
| , | 700 | 300 | 800 | 400 |
| . | 800 | 300 | 900 | 400 |
| Space | 300 | 400 | 700 | 500 |

| Indication position | |
|---|---|
| Coordinate Xb | Coordinate Yb |
| 400 | 200 |

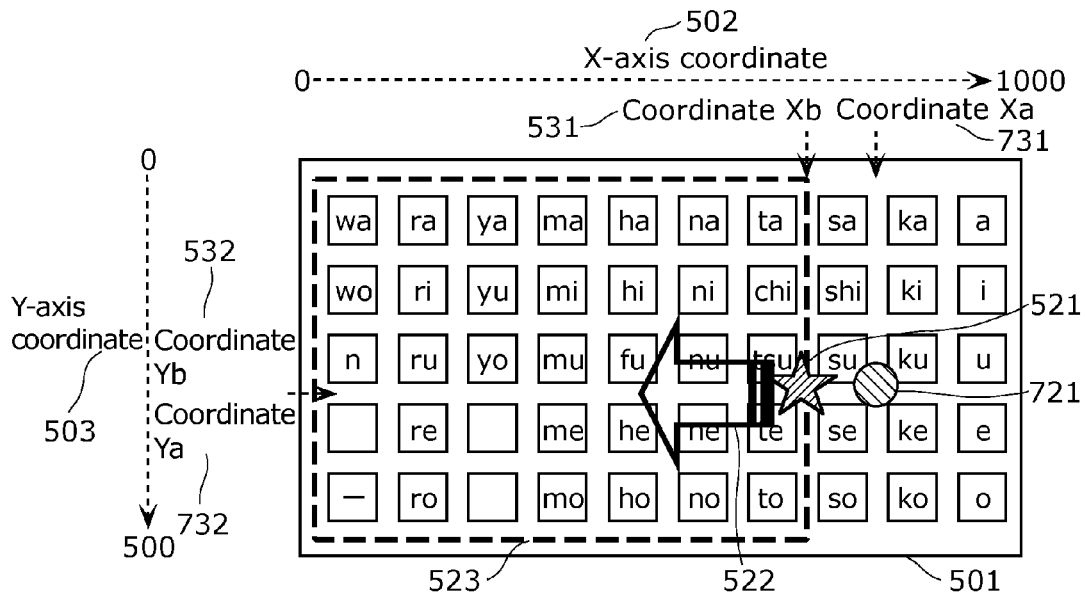

FIG. 12

| Indication direction | Character range condition |
|---|---|
| | (Start position) : (End position) |
| Coordinate Xa = Coordinate Xb<br>Coordinate Ya > Coordinate Yb | (0, 0) : (1000, Coordinate Yb) |
| Coordinate Xa = Coordinate Xb<br>Coordinate Ya < Coordinate Yb | (0, Coordinate Yb) : (1000, 500) |
| Coordinate Xa > Coordinate Xb<br>Coordinate Ya = Coordinate Yb | (0, 0) : (Coordinate Xb, 500) |
| Coordinate Xa < Coordinate Xb<br>Coordinate Ya = Coordinate Yb | (Coordinate Xb, 0) : (1000, 500) |
| Coordinate Xa > Coordinate Xb<br>Coordinate Ya > Coordinate Yb | (0, 0) : (Coordinate Xb, Coordinate Yb) |
| Coordinate Xa > Coordinate Xb<br>Coordinate Ya < Coordinate Yb | (0, Coordinate Yb) : (Coordinate Xb, 500) |
| Coordinate Xa < Coordinate Xb<br>Coordinate Ya > Coordinate Yb | (Coordinate Xb, 0) : (1000, Coordinate Yb) |
| Coordinate Xa < Coordinate Xb<br>Coordinate Ya < Coordinate Yb | (Coordinate Xb, Coordinate Yb) : (1000, 500) |

| Indication position | | |
|---|---|---|
| Time lapse | Coordinate Xb | Coordinate Yb |
| 1 | 800 | 300 |
| 2 | 700 | 300 |
| 3 | 800 | 300 |

| Indication starting point | | |
|---|---|---|
| Time lapse | Coordinate Xa | Coordinate Ya |
| 1 | 800 | 300 |
| 2 | 700 | 300 |

| 541 | Indication position 521 | 531 | 532 |
|---|---|---|---|
| Time lapse | Coordinate Xb | Coordinate Yb |
| 1 | 800 | 300 |
| 2 | 800 | 200 |
| 3 | 700 | 200 |

| Indication starting point 721 | |
|---|---|
| 731 — Coordinate Xa | Coordinate Ya — 732 |
| 800 | 300 |

| | Indication position 521 | | |
|---|---|---|---|
| 541 Time lapse | | Coordinate Xb 531 | Coordinate Yb 532 |
| 1 | | 700 | 300 |
| 2 | | 600 | 300 |
| 3 | | 500 | 300 |

| | Indication position | |
|---|---|---|
| Time lapse | Coordinate Xb | Coordinate Yb |
| 1 | 800 | 300 |
| 2 | 500 | 300 |
| 3 | 600 | 300 |

| Indication starting point | |
|---|---|
| Coordinate Xa | Coordinate Ya |
| 800 | 300 |

FIG. 19

| Indication direction | Character range condition | |
|---|---|---|
| | (Start position) : (End position) | |
| Coordinate Xa = Coordinate Xb<br>Coordinate Ya > Coordinate Yb | (0, Coordinate Yb)<br>: (1000, Coordinate Ya) | |
| Coordinate Xa = Coordinate Xb<br>Coordinate Ya < Coordinate Yb | (0, Coordinate Ya)<br>: (1000, Coordinate Yb) | |
| Coordinate Xa > Coordinate Xb<br>Coordinate Ya = Coordinate Yb | (Coordinate Xb, 0)<br>: (Coordinate Xa, 500) | |
| Coordinate Xa < Coordinate Xb<br>Coordinate Ya = Coordinate Yb | (Coordinate Xa, 0)<br>: (Coordinate Xb, 500) | |
| Coordinate Xa > Coordinate Xb<br>Coordinate Ya > Coordinate Yb | (Coordinate Xb, Coordinate Yb)<br>: (Coordinate Xa, Coordinate Ya) | |
| Coordinate Xa > Coordinate Xb<br>Coordinate Ya < Coordinate Yb | (Coordinate Xb, Coordinate Ya)<br>: (Coordinate Xa, Coordinate Yb) | |
| Coordinate Xa < Coordinate Xb<br>Coordinate Ya > Coordinate Yb | (Coordinate Xa, Coordinate Yb)<br>: (Coordinate Xb, Coordinate Ya) | |
| Coordinate Xa < Coordinate Xb<br>Coordinate Ya < Coordinate Yb | (Coordinate Xa, Coordinate Ya)<br>: (Coordinate Xb, Coordinate Yb) | |

| Indication position 521 | 531 | 532 |
|---|---|---|
| Time lapse | Coordinate Xb | Coordinate Yb |
| 1 | 800 | 300 |
| 2 | 750 | 300 |
| 3 | 700 | 300 |

FIG. 22

| Indication direction (402) | Character range condition (403) |
|---|---|
| | (Start position) : (End position) (404) (405) |
| ⋮ | |
| ⋮ | |
| Horizontally left (421) | (Coordinate Xb − 200, 0) (411) : (Coordinate Xb, 500) (411) |
| ⋮ | |
| ⋮ | |
| ⋮ | |
| ⋮ | |
| ⋮ | |

401C

| 541 | Indication position 521 | | 531 | 532 | 533 |
|---|---|---|---|---|---|
| | Time lapse | Coordinate Xb | Coordinate Yb | Indication angle |
| | 1 | 800 | 0 | 0 |
| | 2 | 750 | 100 | 63 |
| | 3 | 700 | 200 | 63 |

FIG. 24

| Indication direction (402) | Angle range (406) | | Character range condition (403) |
|---|---|---|---|
| | | | (Start position) (404) : (End position) (405) |
| ⋮ | 407 | | |
| Diagonally down left 424 | Reference range | | (Coordinate Xb - 500, Coordinate Yb) : (Coordinate Xb, 500) |
| | Deletion range 408 | 0 <, < 30 | (Coordinate Xb - 100, Coordinate Yb + 100) : (Coordinate Xb, 500) |
| | | 30 <=, <= 60 | (Coordinate Xb - 100, 400) : (Coordinate Xb, 500) |
| | | | (Coordinate Xb - 500, Coordinate Yb) : (Coordinate Xb - 300, Coordinate Yb + 100) |
| | | 60 <, < 90 | (Coordinate Xb - 500, Coordinate Yb) : (Coordinate Xb - 300, Coordinate Yb + 200) |
| ⋮ | | | 411     412 |

| 541 | Indication position 521 | 531 | 532 | 533 |
|---|---|---|---|---|
| Time lapse | Coordinate Xb | Coordinate Yb | Indication angle |
| 1 | 900 | 0 | 0 |
| 2 | 800 | 100 | 45 |
| 3 | 700 | 200 | 45 |

| 541 | Indication position 521 | 531 | 532 | 533 |
|---|---|---|---|---|
| Time lapse | Coordinate Xb | Coordinate Yb | Indication angle |
| 1 | 900 | 100 | 0 |
| 2 | 800 | 150 | 26 |
| 3 | 700 | 200 | 26 |

| Indication position 521 531 532 | | |
|---|---|---|
| Time lapse 541 | Coordinate Xb | Coordinate Yb |
| 1 | 700 | 300 |
| 2 | 600 | 300 |
| 3 | 500 | 300 |
| 4 | 400 | 200 |

| Input character position 751 | |
|---|---|
| Coordinate Xm 761 | Coordinate Ym 762 |
| 700 | 300 |

FIG. 30

| Display area | 782 |
|---|---| tsukue
tsuna
tsune
tsuma
tsume
tsuru
tsukushi
tsute
tsushi
tsuyu
tsurara
tsuwamono
tsukuba
tsunokakushi
tsumiki
tsurezuregusa
tsuchifumazu

| 531 | 521 | 532 |
|---|---|---|
| | Indication position | |
| Coordinate Xb | | Coordinate Yb |
| 800 | | 300 |

| 561 | 551 | 562 |
|---|---|---|
| | Indication position | |
| Coordinate Xc | | Coordinate Yc |
| 400 | | 300 |

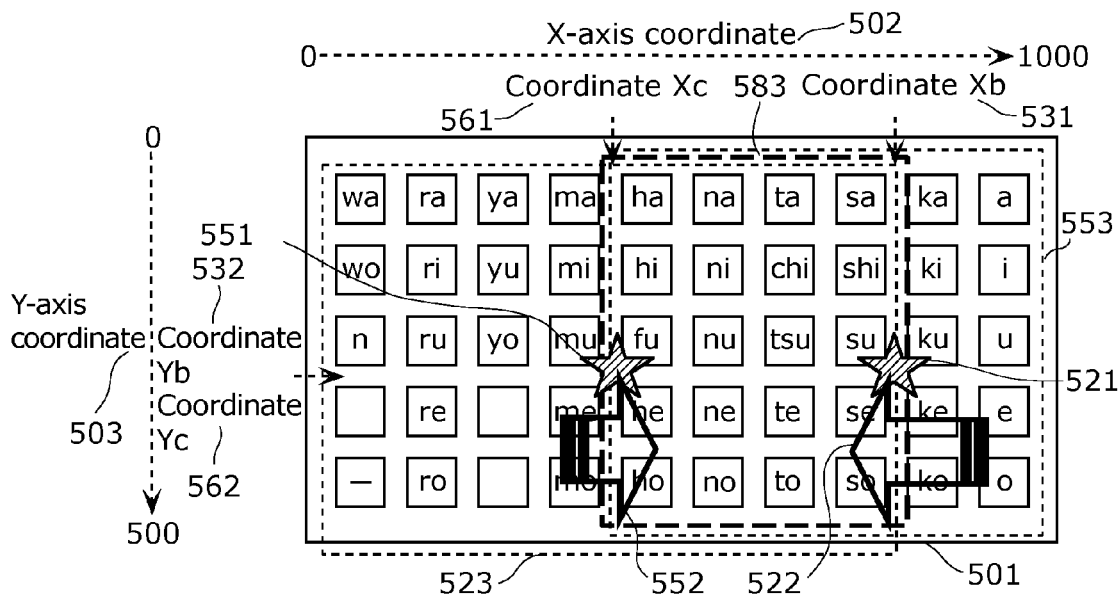

| 541 | Indication position 521 | 531 | 532 |
|---|---|---|---|
| Time lapse | Coordinate Xb | Coordinate Yb |
| 1 | 900 | 300 |
| 2 | 850 | 300 |
| 3 | 800 | 300 |

| 571 | Indication position 551 | 561 | 562 |
|---|---|---|---|
| Time lapse | Coordinate Xc | Coordinate Yc |
| 1 | 400 | 300 |

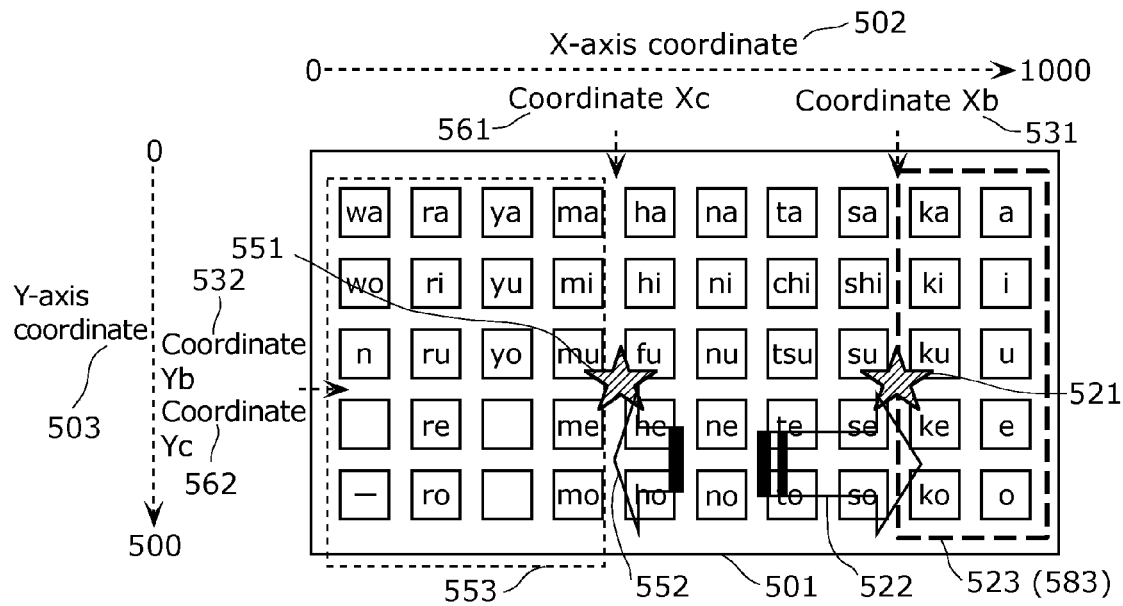

CHARACTER INPUT PREDICTION APPARATUS, CHARACTER INPUT PREDICTION METHOD, AND CHARACTER INPUT SYSTEM

TECHNICAL FIELD

The present invention relates to a character input prediction apparatus, a character input prediction method, and a character input system, and particularly relates to a character input prediction apparatus that predicts a character string inputted by a user.

BACKGROUND ART

As a predictive candidate control method for improving conventional character string input efficiency, for example, there is a character string prediction method described in Patent Literature (PTL) 1. In the method, a plurality of characters are assigned to a character key according to a preset condition. A character string already inputted is combined with each character assigned to the character key, to generate a character string. For each generated character string, a word dictionary is searched for a character string whose pronunciation starts with the generated character string, as a result of which predictive character strings are generated from the corresponding character strings. Display order of the predictive character strings is determined by a predetermined procedure.

CITATION LIST

Patent Literature

[PTL 1]
Japanese Unexamined Patent Application Publication No. 2002-14956

SUMMARY OF INVENTION

Technical Problem

However, such a character input prediction apparatus is required to narrow down predictive character strings more speedily.

The present invention is intended to solve the conventional problem stated above, and has an object of providing a character input prediction apparatus and a character input prediction method that can narrow down predictive character strings at high speed.

Solution to Problem

To solve the conventional problem stated above, a character input prediction apparatus according to one aspect of the present invention includes: a first operation input unit that obtains information of a first character input operation that is performed by a user using a character key layout display in which a plurality of character keys are arranged; a dictionary storage unit that stores a dictionary including a plurality of candidate character strings; a character key layout management unit that stores a character key layout showing the arrangement of the plurality of character keys in the character key layout display; a first indication movement detection unit that detects a first indication position and a first indication direction in the character key layout display from the information of the first character input operation, the first indication position showing a position of the first character input operation, and the first indication direction showing a movement direction of the first character input operation; a first filter generation unit that determines a first character range in the character key layout display using the first indication position, the first indication direction, and the character key layout, the first character range being located in the first indication direction with the first indication position as a base point; and a dictionary search unit that searches the plurality of candidate character strings included in the dictionary, for a predictive character string that includes any character included in the first character range.

Note that such an overall or specific embodiment may be implemented by a system, a method, an integrated circuit, a computer program, or a recording medium, or any combination of a system, a method, an integrated circuit, a computer program, and a recording medium.

Advantageous Effects of Invention

According to the present invention, it is possible to provide a character input prediction apparatus and a character input prediction method that can narrow down predictive character strings at high speed.

BRIEF DESCRIPTION OF DRAWINGS

FIG. 4 is a diagram showing a structure of a character key layout according to Embodiment 1 of the present invention.

FIG. 6 is a diagram showing a structure of a character range definition according to Embodiment 1 of the present invention.

FIG. 7 is a diagram showing a structure of a character key layout according to Embodiment 1 of the present invention.

FIG. 11A is a diagram showing an operation example of the character input prediction apparatus according to Embodiment 2 of the present invention.

FIG. 11B is a diagram showing an example of an indication position according to Embodiment 2 of the present invention.

FIG. 11C is a diagram showing an example of an indication starting point according to Embodiment 2 of the present invention.

FIG. 12 is a diagram showing a structure of a character range definition according to Embodiment 2 of the present invention.

FIG. 19 is a diagram showing a structure of a character range definition according to Embodiment 6 of the present invention.

FIG. 22 is a diagram showing a structure of a character range definition according to Embodiment 7 of the present invention.

FIG. 24 is a diagram showing a structure of a character range definition according to Embodiment 8 of the present invention.

FIG. 30 is a diagram showing an example of a display area according to Embodiment 9 of the present invention.

FIG. 37A is a diagram showing an operation example of a character input prediction apparatus according to Embodiment 11 of the present invention.

FIG. 37B is a diagram showing an example of an indication position according to Embodiment 11 of the present invention.

FIG. 37C is a diagram showing an example of an indication position according to Embodiment 11 of the present invention.

FIG. 39A is a diagram showing an operation example of a character input prediction apparatus according to Embodiment 13 of the present invention.

FIG. 39B is a diagram showing an example of an indication position according to Embodiment 13 of the present invention.

FIG. 39C is a diagram showing an example of an indication position according to Embodiment 13 of the present invention.

DESCRIPTION OF EMBODIMENTS

Findings on which the Present Invention is Based

The inventors of the present invention have found the following problem.

Figure 40:
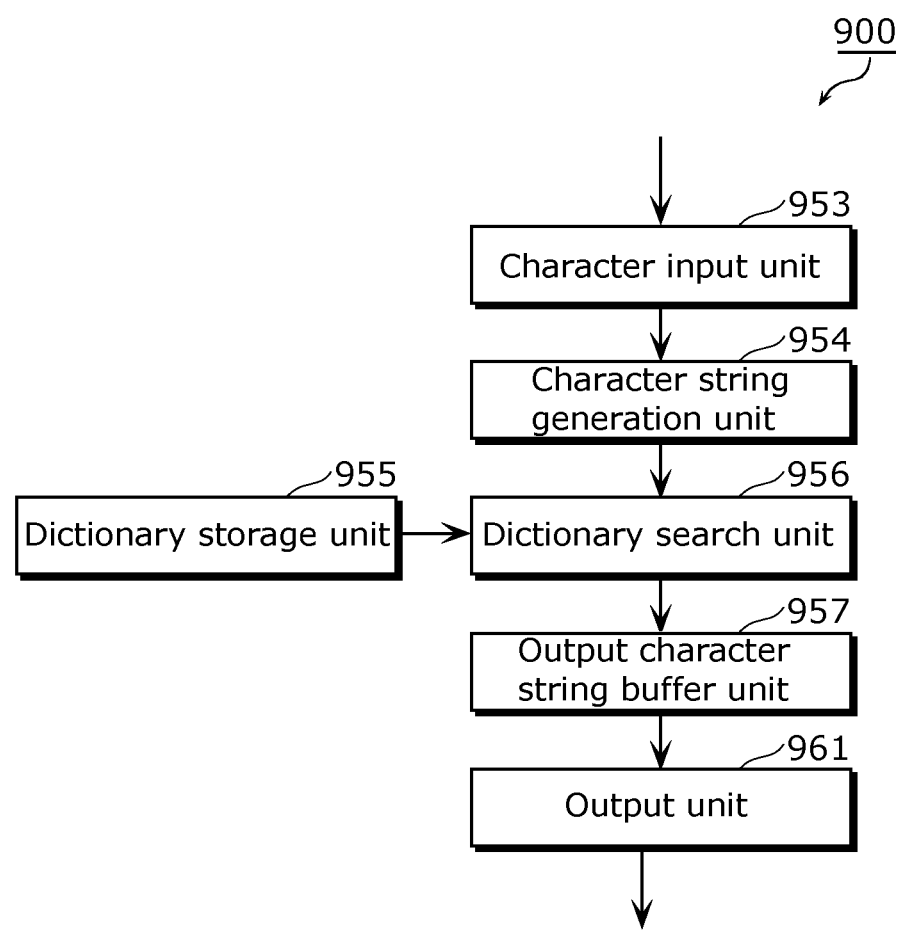
FIG. 40 is a block diagram of a character input prediction apparatus.

FIG. 40 is a block diagram of a character string prediction apparatus to which the present invention is not applied.

A character input prediction apparatus 900 shown in FIG. 40 includes: a character input unit 953 that receives an input character; a character string generation unit 954 that generates a character string from the input character; a dictionary storage unit 955 that stores a dictionary including a plurality of candidate character strings; a dictionary search unit 956 that searches the dictionary for each predictive character string based on the character string generated by the character string generation unit 954; an output character string buffer unit 957 that manages a display method of an output destination and output order of the predictive character strings; and an output unit 961 that outputs the predictive character strings to a display apparatus.

In this structure, upon input of one or more characters, a word dictionary or the like is searched to extract each character string (word) that starts with the characters in input order. In the case where there are many predictive character strings, however, it tends to take long for the user to find a desired input character string. Such a character input prediction apparatus is therefore required to narrow down predictive character strings more speedily.

The present invention is intended to solve the problem stated above, and has an object of providing a character input prediction apparatus and a character input prediction method that can narrow down predictive character strings at high speed.

To solve the problem stated above, a character input prediction apparatus according to one aspect of the present invention includes: a first operation input unit that obtains information of a first character input operation that is performed by a user using a character key layout display in which a plurality of character keys are arranged; a dictionary storage unit that stores a dictionary including a plurality of candidate character strings; a character key layout management unit that stores a character key layout showing the arrangement of the plurality of character keys in the character key layout display; a first indication movement detection unit that detects a first indication position and a first indication direction in the character key layout display from the information of the first character input operation, the first indication position showing a position of the first character input operation, and the first indication direction showing a movement direction of the first character input operation; a first filter generation unit that determines a first character range in the character key layout display using the first indication position, the first indication direction, and the character key layout, the first character range being located in the first indication direction with the first indication position as a base point; and a dictionary search unit that searches the plurality of candidate character strings included in the dictionary, for a predictive character string that includes any character included in the first character range.

With this structure, the character input prediction apparatus according to one aspect of the present invention narrows down the input character range according to the movement direction of the character input operation by the user, and searches for the predictive character string that includes any character included in the character range. Thus, the character input prediction apparatus can narrow down predictive character strings before the user finishes inputting characters, and so can narrow down predictive character strings at high speed.

Moreover, the character input prediction apparatus may further include: a character input unit that obtains information of an input character inputted by the first character input operation; and a character string generation unit that generates an input character string by arranging the input character in input order, wherein the dictionary search unit searches the plurality of candidate character strings included in the dictionary, for the predictive character string that starts with a character string generated by adding, immediately following the input character string, any character included in the first character range.

Moreover, the character input prediction apparatus may further include an indication position storage unit that holds an indication starting point, wherein the first indication movement detection unit: detects the first indication position at predetermined time intervals; in the case where the indication starting point is not held in the indication position storage unit, causes the indication position storage unit to hold the detected first indication position as the indication starting point; and detects, as the movement direction, a direction of a newly detected first indication position with the indication starting point as a starting point.

With this structure, the character input prediction apparatus according to one aspect of the present invention can detect the indication direction using the indication starting point.

Moreover, the first indication movement detection unit may, in the case where the input character is inputted by the first character input operation, cause the indication position storage unit to hold a position of a character key corresponding to the input character, as the indication starting point.

With this structure, the character input prediction apparatus according to one aspect of the present invention can determine the indication direction with respect to the position of the inputted character key, with it being possible to detect the more appropriate indication direction.

Moreover, the first operation input unit may obtain the information of the first character input operation performed via an input apparatus that limits the movement direction of the character input operation to a vertical direction and a horizontal direction.

With this structure, the character input prediction apparatus according to one aspect of the present invention can also be applied to the case of using an input apparatus such as arrow keys.

Moreover, the first indication movement detection unit may detect the first indication position at predetermined time intervals, wherein the character input prediction apparatus further includes an indication position storage unit that holds a plurality of indication positions detected by the first indication movement detection unit, and the first indication movement detection unit calculates the first indication direction using the plurality of indication positions held in the indication position storage unit.

With this structure, the character input prediction apparatus according to one aspect of the present invention can detect the indication direction using the plurality of indication positions.

Moreover, the first filter generation unit may, in the case where the position of the first character input operation moves from the indication starting point to the first indication position that is located in a first direction relative to the indication starting point and then moves from the first indication position to a second indication position that is located in a second direction relative to the first indication position, determine a range between the indication starting point and the second indication position as the first character range, the second direction being opposite to the first direction.

With this structure, the character input prediction apparatus according to one aspect of the present invention can determine the appropriate character range even in the case where such an operation that causes the indication position to move in one direction and then return in the opposite direction is performed.

Moreover, the first indication movement detection unit may detect the first indication position at predetermined time intervals, wherein the character input prediction apparatus further includes an indication position storage unit that holds a plurality of indication positions detected by the first indication movement detection unit, the first indication movement detection unit further calculates a movement speed of the first character input operation, from the plurality of indication positions, and the first filter generation unit: in the case where the movement speed is equal to or more than a first speed, determines a first range in the character key layout display as the first character range; and in the case where the movement speed is less than the first speed, determines a second range in the character key layout display as the first character range, the first range being located in the first indication direction with the first indication position as the base point, and the second range being located in the first indication direction with the first indication position as the base point and being smaller than the first range.

With this structure, the character input prediction apparatus according to one aspect of the present invention can determine the more appropriate character range using the movement speed of the character input operation.

Moreover, the first indication movement detection unit may detect the first indication position at predetermined time intervals, wherein the character input prediction apparatus further includes an indication position storage unit that holds a plurality of indication positions detected by the first indication movement detection unit, the first indication movement detection unit further calculates a movement speed of the first character input operation, from the plurality of indication positions, and the first filter generation unit: in the case where the movement speed is less than a second speed, determines a first range in the character key layout display as the first character range; and in the case where the movement speed is equal to or more than the second speed, determines a second range as the first character range, the first range being located in the first indication direction with the first indication position as the base point, and the second range being obtained by excluding, from the first range, a range that is included in the first range and is nearer the first indication position.

With this structure, the character input prediction apparatus according to one aspect of the present invention can determine the more appropriate character range using the movement speed of the character input operation.

Moreover, the first indication movement detection unit may calculate an indication angle which is a movement angle of the first character input operation, the indication angle being obtained by classifying an angle of the first indication direction, wherein the first filter generation unit determines the first character range by excluding, from a reference range set for the first indication direction, a deletion range set for the indication angle.

With this structure, the character input prediction apparatus according to one aspect of the present invention can determine the more appropriate character range using the movement angle of the character input operation.

Moreover, the character input prediction apparatus may further include: a second operation input unit that obtains information of a second character input operation that is performed by the user using the character key layout display; a second indication movement detection unit that detects a second indication position and a second indication direction in the character key layout display from the information of the second character input operation, the second indication position showing a position of the second character input operation, and the second indication direction showing a movement direction of the second character input operation; a second filter generation unit that determines a second character range in the character key layout display using the second indication position, the second indication direction, and the character key layout, the second character range being located in the second indication direction with the second indication position as the base point; and a filter synthesis unit that extracts a third character range that is included in both the first character range and the second character range, wherein the dictionary search unit searches the plurality of candidate character strings included in the dictionary, for the predictive character string that includes any character included in the third character range.

With this structure, the character input prediction apparatus according to one aspect of the present invention can narrow down predictive character strings at high speed, in the case of using two character input operations.

Moreover, the filter synthesis may further determine, as the third character range, a range that is included in the first character range and is located in a direction toward the first indication position with the second indication position as the base point, in the case where the position of the first character input operation moves and a movement amount of the position of the second character input operation is equal to or less than a predetermined threshold.

With this structure, the character input prediction apparatus according to one aspect of the present invention can determine the more appropriate character range in the case where the position of only one of the two character input operations moves.

Moreover, the filter synthesis unit may further determine, as the third character range, a range that is included in the first character range and is located in a direction toward the first indication position with a reference point as the base point, in the case where the position of the first character input operation moves and a movement amount of the position of the second character input operation is equal to or less than a predetermined threshold, wherein the reference point is a point between the first indication position and the second indication position.

With this structure, the character input prediction apparatus according to one aspect of the present invention can determine the more appropriate character range in the case where the position of only one of the two character input operations moves.

Moreover, the filter synthesis unit may further: determine the first character range as the third character range in the case where the position of the first character input operation has a larger movement amount than the position of the second character input operation; and determine the second character range as the third character range in the case where the position of the second character input operation has a larger movement amount than the position of the first character input operation.

With this structure, the character input prediction apparatus according to one aspect of the present invention can determine the more appropriate character range in the case where the positions of the two character input operations move away from each other.

Moreover, the first filter generation unit may: determine the first character range at predetermined time intervals, and determine a change between the first character range previously determined and the first character range newly determined; and update the first character range to the newly determined first character range in the case where the change is equal to or more than a predetermined threshold, wherein the dictionary search unit searches the plurality of candidate character strings included in the dictionary, for the predictive character string that includes any character included in the updated first character range.

With this structure, the character input prediction apparatus according to one aspect of the present invention updates prediction result display or the like only in the case where the prediction result changes significantly, with it being possible to prevent the prediction result display or the like from being frequently updated.

Moreover, the character input prediction apparatus may display the first character range on the character key layout display.

With this structure, the character input prediction apparatus according to one aspect of the present invention can present the predicted character range to the user.

Moreover, the character input prediction apparatus may display the predictive character string that includes any character included in the first character range and is searched for by the dictionary search unit.

With this structure, the character input prediction apparatus according to one aspect of the present invention can display each predictive character string including a predicted character to the user in highlight mode.

Note that the present invention may be realized not only as such a character input prediction apparatus, but also as a character input prediction method including steps corresponding to the characteristic units included in the character input prediction apparatus, or a program causing a computer to execute such characteristic steps. The program may be distributed via a non-transitory computer-readable recording medium such as a CD-ROM or a transmission medium such as the Internet.

The present invention may also be realized as a semiconductor integrated circuit (LSI) that implements part or all of the functions of the character input prediction apparatus, or a character input system including the character input prediction apparatus.

The following describes embodiments of the present invention with reference to drawings. The embodiments described below each represent a preferred embodiment of the present invention. The numerals, forms, materials, components, component layout positions, connections, steps, step sequences, and the like described in the embodiments are merely examples, and should not limit the scope of the present invention. The present invention is specified by the claims. Accordingly, the components that are included in the embodiments but are not defined in the independent claims representing the broadest concepts of the present invention are described as not being necessarily required for achieving the object of the present invention but constituting more preferred embodiments.

Embodiment 1

A character input prediction apparatus according to Embodiment 1 of the present invention narrows down an input character range according to a movement direction of a character input operation by the user, and searches for a predictive character string that includes any character included in the character range. Thus, the character input prediction apparatus can narrow down predictive character strings before the user finishes inputting a next character, and so can narrow down predictive character strings at high speed.

In detail, the character input prediction apparatus generates each predictive character string using any character assigned to a character key layout included in a movement direction of a character input operation.

Embodiment 1 of the present invention describes an example of the case where one character range inputted by the user is predicted from one indication position showing a position of a character input operation and one indication direction showing a movement direction of the character input operation.

A basic structure of the character input prediction apparatus according to Embodiment 1 of the present invention is described first.

Figure 1:
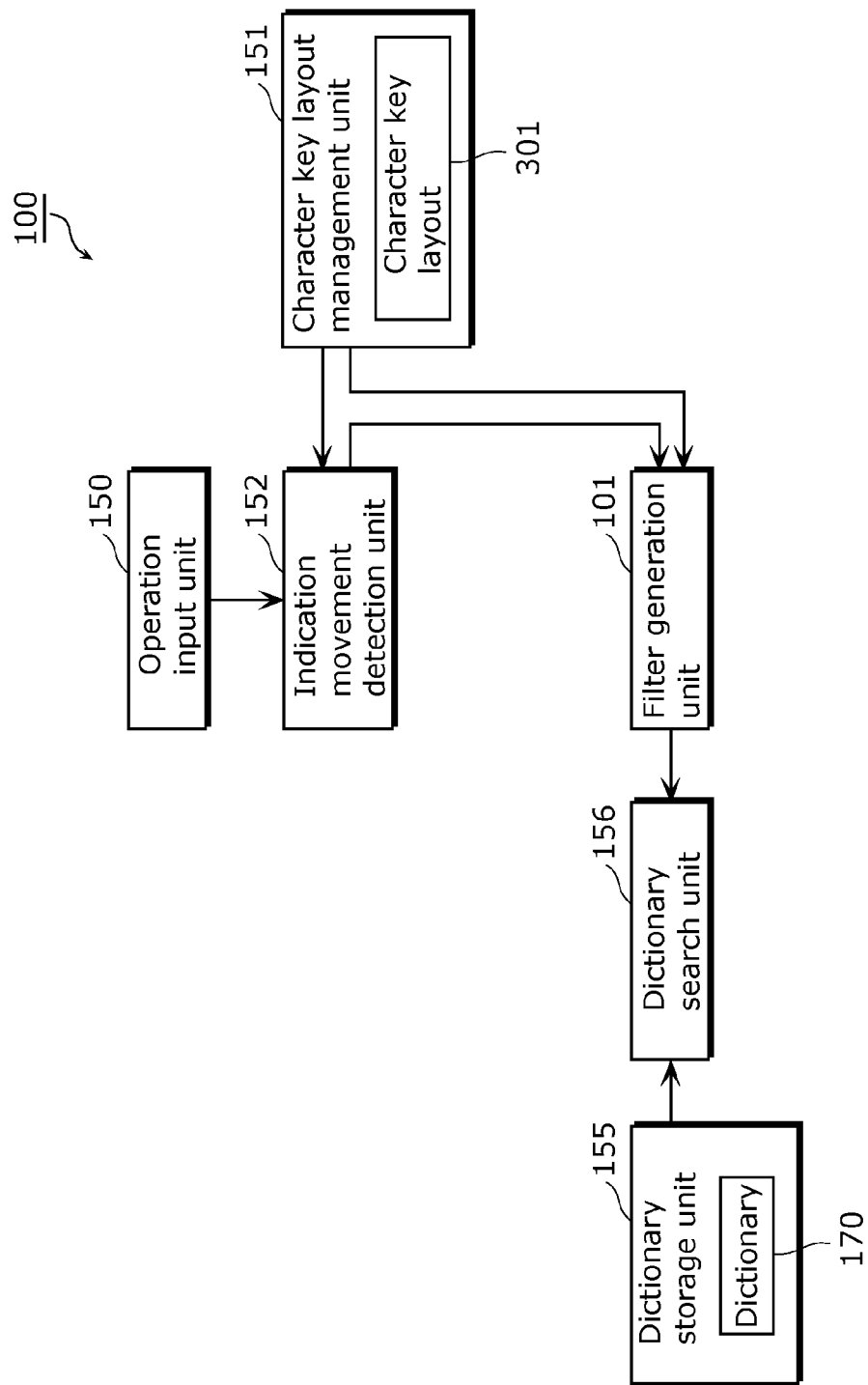
FIG. 1 is a block diagram of a character input prediction apparatus according to Embodiment 1 of the present invention.

FIG. 1 is a block diagram showing a basic structure of a character input prediction apparatus 100 according to Embodiment 1 of the present invention.

The character input prediction apparatus 100 shown in FIG. 1 predicts a character range inputted by the user before the user inputs characters, and outputs each predictive character string according to the prediction result.

The character input prediction apparatus 100 includes a filter generation unit 101, an operation input unit 150, a character key layout management unit 151, an indication movement detection unit 152, a dictionary storage unit 155, and a dictionary search unit 156.

The operation input unit 150 obtains character input operation information which is information of a character input operation that is performed by the user using a character key layout display in which a plurality of character keys are arranged.

The dictionary storage unit 155 stores a dictionary 170 including a plurality of candidate character strings.

The character key layout management unit 151 stores a character key layout 301 showing the arrangement of the plurality of character keys in the character key layout display.

The indication movement detection unit 152 detects an indication position 521 and an indication direction 522 in the character key layout display from the character input operation information obtained by the operation input unit 150, the indication position 521 showing a position of the character input operation, and the indication direction 522 showing a movement direction of the character input operation.

The filter generation unit 101 determines a character range 523 in the character key layout display using the indication position 521, the indication direction 522, and the character key layout 301, the character range 523 being located in the indication direction 522 with the indication position 521 as a base point.

The dictionary search unit 156 searches the plurality of candidate character strings included in the dictionary 170, for a character string (hereafter "predictive character string") that includes any character included in the character range 523.

An operation flow of the character input prediction apparatus 100 is described next.

Figure 2:
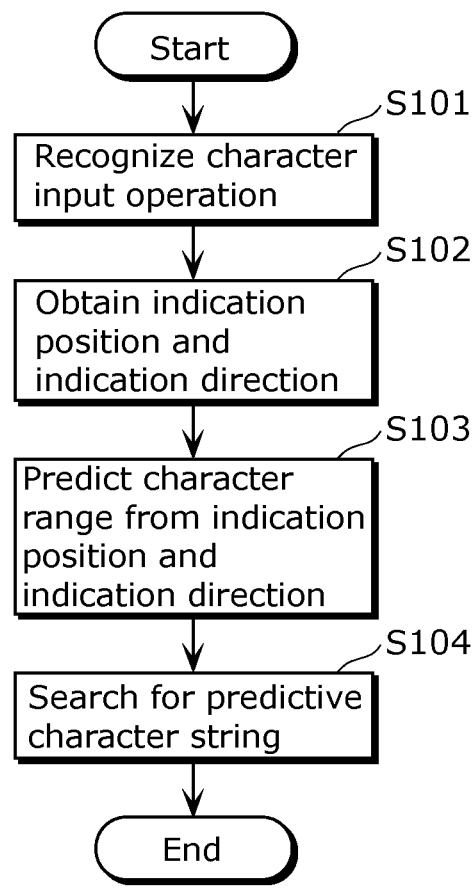
FIG. 2 is a flowchart of a character input prediction process according to Embodiment 1 of the present invention.

FIG. 2 is a flowchart of a character input prediction process by the character input prediction apparatus 100 according to Embodiment 1 of the present invention.

First, the indication movement detection unit 152 recognizes that the character input operation by the user occurs, via the operation input unit 150 (Step S101).

The indication movement detection unit 152 then detects the indication position 521 and the indication direction 522 based on the character input operation (Step S102).

Next, the filter generation unit 101 determines the character range 523 located in the indication direction 522 with the indication position 521 as the base point, in the character key layout display (Step S103).

After this, the dictionary search unit 156 searches the plurality of candidate character strings included in the dictionary 170, for a predictive character string that includes any predictive character included in the character range 523 (Step S104).

The following describes a detailed structure and operation of the character input prediction apparatus 100 according to Embodiment 1 of the present invention.

In the following description, the same components in the drawings are given the same reference signs, and repeated description is omitted.

Figure 3:
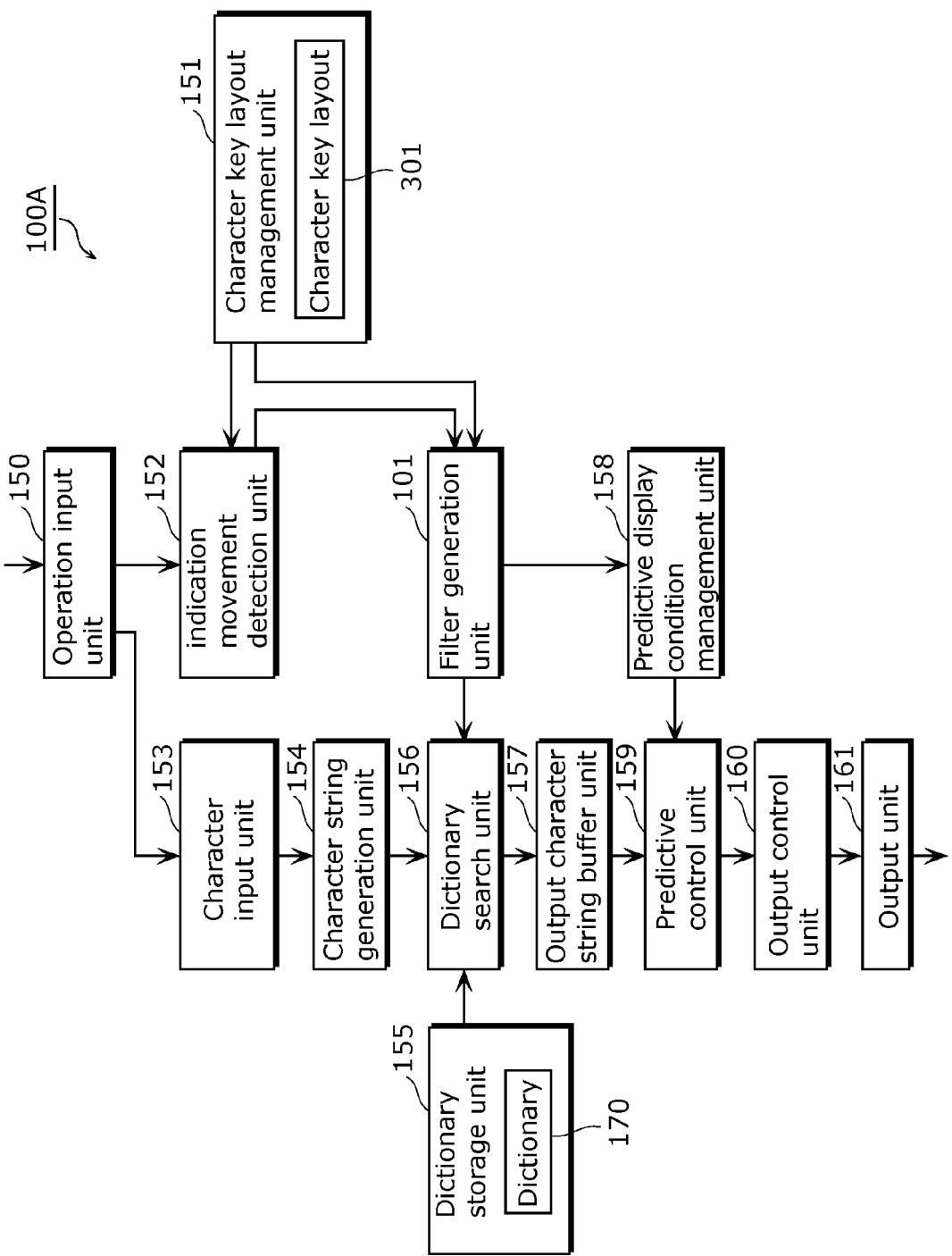
FIG. 3 is a block diagram of a character input prediction apparatus according to Embodiment 1 of the present invention.

FIG. 3 is a block diagram showing a detailed structure of a character input prediction apparatus 100A according to Embodiment 1 of the present invention.

The character input prediction apparatus 100A shown in FIG. 3 predicts a character range inputted by the user before the user inputs characters, and outputs each predictive character string according to the prediction result.

The character input prediction apparatus 100A further includes a character input unit 153, a character string generation unit 154, an output character string buffer unit 157, a predictive display condition management unit 158, a predictive control unit 159, an output control unit 160, and an output unit 161, in addition to the structure shown in FIG. 1.

The character input unit 153 obtains an input character inputted by the user operating the plurality of character keys.

The character string generation unit 154 generates a character string from the input character obtained by the character input unit 153. In detail, in a state where no character has been inputted, the character string generation unit 154 generates a newly inputted character as a character string. In the case where a next character is inputted, the character string generation unit 154 generates a character string as a new character string by adding, immediately following the current character string, the newly inputted character.

The character key layout management unit 151 stores the character key layout 301 showing the arrangement of the plurality of character keys to which characters are assigned.

FIG. 4 is a diagram showing an example of the character key layout 301.

As shown in FIG. 4, the character key layout 301 includes a plurality of characters 302 and a layout position 303 corresponding to each of the plurality of characters 302. The character 302 shows a display character arranged in a character key. The layout position 303 shows a display position (coordinate) of the corresponding character 302 in the character key.

The layout position 303 includes a start position 304 of the character position and an end position 305 of the character position. In an example where the character 302 is displayed in a rectangle, the start position 304 and the end position 305 are respectively coordinates of two diagonally opposite corners of the rectangle. The start position 304 includes an X-axis coordinate 341 and a Y-axis coordinate 342. The end position 305 includes an X-axis coordinate 351 and a Y-axis coordinate 352.

The indication movement detection unit 152 detects the indication position 521 showing the position of the character input operation by the user and the indication direction 522 showing the movement direction of the character input operation. In detail, the indication movement detection unit 152 represents the operation position where the user performs the input operation using an X-axis coordinate and a Y-axis coordinate, and detects the represented operation position as the indication position 521. The indication movement detection unit 152 also detects the movement direction of the character input operation as the indication direction 522.

As a method of character input by the user, the following methods are available. A first method is a method of moving a pointer by a mouse, a touchpad, arrow keys, or the like, and selecting a character at a position of the pointer by a mouse click, a button press, or the like. In this case, the indication position 521 is the position of the pointer, and the indication direction 522 is the direction in which the pointer moves.

Second and third methods are methods using a touch panel. The second method is a method in which the user slides his/her finger on the touch panel. A character is selected by the user pressing the panel firmly or stopping the finger for a predetermined time or more. In this case, the indication position 521 is the position of the user's finger in contact with the touch panel, and the indication direction 522 is the direction in which the user's finger moves.

The third method is a method in which the user inputs a character by touching a character position on the touch panel. In this case, the indication position 521 is the position touched by the user, and the indication direction 522 is the direction in which the user lifts his/her finger off the touch panel. This information can be detected by sensing from which part of a contact surface between the touch panel and the finger the finger starts moving away from the touch panel.

Figures 5A, 5B:
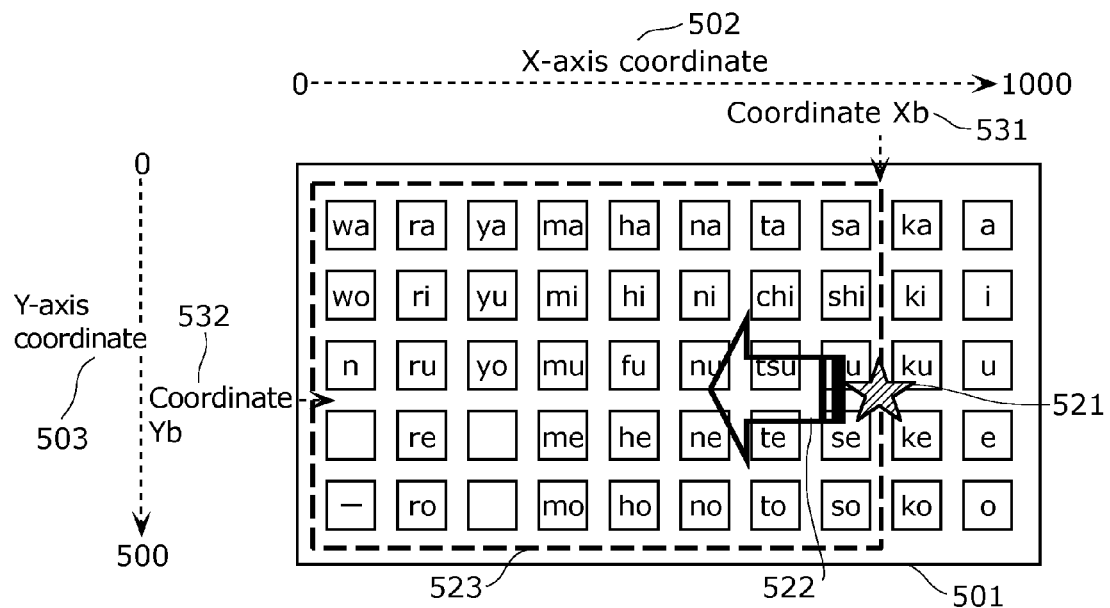
FIG. 5A is a diagram showing an operation example of the character input prediction apparatus according to Embodiment 1 of the present invention.
FIG. 5B is a diagram showing an example of an indication position according to Embodiment 1 of the present invention.

FIG. 5A is a diagram showing an example of a character key layout display 501.

The indication position 521 shows the position of the character input operation by the user, and moves according to the input operation by the user.

The indication direction 522 represents a state of operation toward a character position inputted by the user, and shows the movement direction of the character input operation.

The character range 523 shows a range of characters which the character input prediction apparatus 100A predicts to be inputted by the user.

A coordinate Xb 531 shows an X-axis coordinate 502 of the indication position 521.

A coordinate Yb 532 shows a Y-axis coordinate 503 of the indication position 521.

FIG. 5B is a diagram showing a specific example of the indication position 521. As shown in FIG. 5B, the indication position 521 includes the coordinate Xb 531 and the coordinate Yb 532.

The filter generation unit 101 determines, from the indication position 521 and the indication direction 522 detected by the indication movement detection unit 152, that the input operation is performed, and predicts the character range 523 inputted by the user. That is, the filter generation unit 101 extracts the character range 523 located in the indication direction 522 with the indication position 521 as the base point, in the character key layout 301.

For example, the filter generation unit 101 determines a character range condition 403 using a character range definition 401 held in the filter generation unit 101, the coordinate Xb 531 and the coordinate Yb 532 included in the indication position 521, and the indication direction 522. The filter generation unit 101 also determines, for each character 302, whether or not the character 302 is within a range of the character range condition 403 using the character range condition 403 and the layout position 303 in the character key layout 301 stored in the character key layout management unit 151, and predicts the character range 523 of character input by the user. The filter generation unit 101 prepares the character range 523 for the character input unit 153, as input characters for the user.

FIG. 6 is a diagram showing an example of the character range definition 401 held in the filter generation unit 101.

The character range definition 401 includes a plurality of indication directions 402 and a character range condition 403 corresponding to each of the plurality of indication directions 402.

The indication direction 402 shows the direction of the character input operation by the user, and corresponds to the above-mentioned indication direction 522.

The character range condition 403 shows a function used for calculating the character range 523 for the corresponding indication direction 402. The character range condition 403 includes a start position 404 and an end position 405. A coordinate Xb 411 corresponds to the coordinate Xb 531 included in the indication position 521, and a coordinate Yb 412 corresponds to the coordinate Yb 532 included in the indication position 521.

The dictionary search unit 156 searches the dictionary 170 for each predictive character string, based on the input character obtained by the character input unit 153. In detail, the dictionary search unit 156 searches for each character string (hereafter "retrieved character string") that starts with the character string generated by the character string generation unit 154.

The output character string buffer unit 157 temporarily holds the retrieved character strings searched for by the dictionary search unit 156, and manages a display method of an output destination and output order of the retrieved character strings.

The predictive display condition management unit 158 holds a display condition using the character range 523, including whether or not to display. For example, from among the retrieved character strings, the predictive display condition management unit 158 displays the predictive character strings that each include any character included in the character range 523, and does not display the other character strings. Alternatively, the predictive display condition management unit 158 may display all retrieved character strings, with the predictive character strings being highlighted.

The predictive control unit 159 performs sorting for display on a character string group outputted from the output character string buffer unit 157, according to the display condition notified from the predictive display condition management unit 158.

The output control unit 160 forms character strings sorted for display by the predictive control unit 159 according to the condition, in conformance with a display apparatus.

The output unit 161 outputs the character strings formed by the output control unit 160, to the display apparatus.

The following describes a specific example of the operation of the character input prediction apparatus 100A according to Embodiment 1 of the present invention.

Suppose the coordinate Xb 531 included in the indication position 521 is "800" and the coordinate Yb 532 included in the indication position 521 is "300", and the indication direction 522 is "horizontally left", as in the example shown in FIGS. 5A and 5B.

In this case, since the indication direction 402 is horizontally left 421 in FIG. 6, the filter generation unit 101 selects "(0, 0):(coordinate Xb 411, 500)" as the character range condition 403. The filter generation unit 101 substitutes the coordinate Xb 531 (=800) for the coordinate Xb 411, thereby obtaining the character range condition 403 "(0, 0):(800, 500)".

The filter generation unit 101 then calculates the character range 523. In detail, the filter generation unit 101 determines, for each character 302, whether or not the character 302 is within a range of the character range condition 403 "(0, 0):(800, 500)", using the character range condition 403 "(0, 0):(800, 500)" and the layout position 303 in the character key layout 301.

The resulting character range 523 is "sa, shi, su, se, so, ta, chi, tsu, te, to, na, ni, nu, ne, no, ha, hi, fu, he, ho, ma, mi, mu, me, mo, ya, yu, yo, ra, ri, ru, re, ro, wa, wo, n, -".

As described above, the character input prediction apparatus 100A according to Embodiment 1 of the present invention narrows down the input character range 523 according to the indication direction 522, and searches for a predictive character string that includes any character included in the character range 523. Thus, the character input prediction apparatus 100A can narrow down predictive character strings before the user finishes inputting characters, and so can narrow down predictive character strings at high speed.

The above describes the case where the dictionary search unit 156 searches the plurality of candidate character strings for each retrieved character string that includes the character string generated by the character string generation unit 154, and the predictive control unit 159 searches the retrieved character strings for each predictive character string that includes the predictive character. However, in the case of not displaying the character strings other than the predictive character strings, the dictionary search unit 156 may search the plurality of candidate character strings for each predictive character string.

The present invention is applicable not only to the case where the user inputs the second or subsequent character of the character string, but also to the case where the user inputs the first character of the character string. In such a case, the character input unit 153 and the character string generation unit 154 described above may be omitted.

Though the above describes the case of performing character input in Japanese, this embodiment is equally applicable to other languages. Likewise, the following embodiments which mainly describe the case of applying the present invention to Japanese input are also applicable to other languages.

Character input in English is described below, as an example.

Figures 8A, 8B:
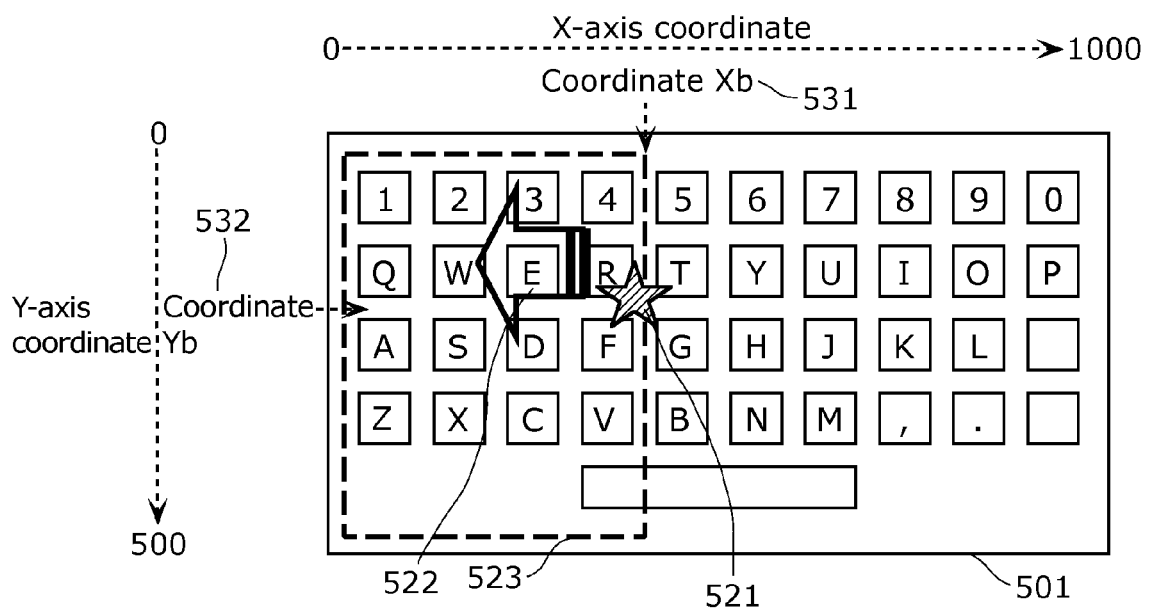
FIG. 8A is a diagram showing an operation example of the character input prediction apparatus according to Embodiment 1 of the present invention.
FIG. 8B is a diagram showing an example of an indication position according to Embodiment 1 of the present invention.

FIG. 7 is a diagram showing an example of the character key layout 301 for English input. FIG. 8A is a diagram showing an example of the character key layout display 501 for English input. FIG. 8B is a diagram showing a specific example of the indication position 521 in this case.

The following describes a specific example of the operation of the character input prediction apparatus 100A in the case of using English input.

Suppose the coordinate Xb 531 included in the indication position 521 is "400" and the coordinate Yb 532 included in the indication position 521 is "200", and the indication direction 522 is "horizontally left", as in the example shown in FIGS. 8A and 8B.

In this case, since the indication direction 402 is the horizontally left 421 in FIG. 6, the filter generation unit 101 selects "(0, 0):(coordinate Xb 411, 500)" as the character range condition 403. The filter generation unit 101 substitutes the coordinate Xb 531 (=400) for the coordinate Xb 411, thereby obtaining the character range condition 403 "(0, 0): (400, 500)".

The filter generation unit 101 then calculates the character range 523. In detail, the filter generation unit 101 determines, for each character 302, whether or not the character 302 is within a range of the character range condition 403 "(0, 0):(400, 500)", using the character range condition 403 "(0, 0):(400, 500)" and the layout position 303 in the character key layout 301.

The resulting character range 523 is "1, 2, 3, 4, Q, W, E, R, A, S, D, F, Z, X, C, V".

Figure 9:
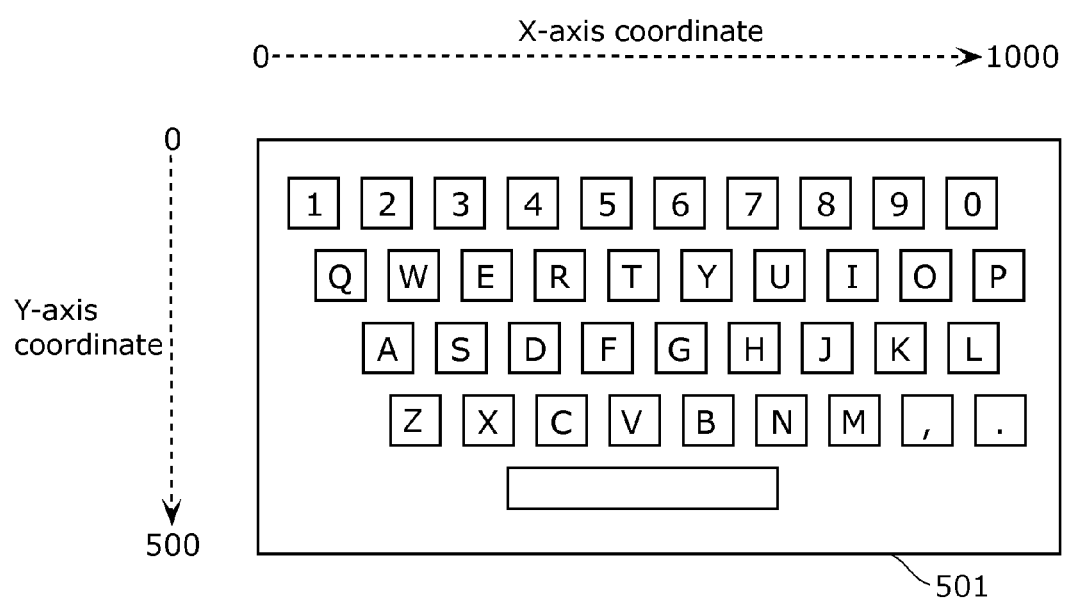
FIG. 9 is a diagram showing an example of a character key layout according to Embodiment 1 of the present invention.

Though the numbers are included in the character key layout display 501 in the example shown in FIG. 8A, the numbers may not be included in the character key layout display 501. Likewise, the marks "," and "." and "space" may not be included in the character key layout display 501. The character key layout display 501 may include a mark and the like other than those mentioned above. Moreover, the character keys may be arranged so as to be vertically staggered as shown in FIG. 9.

Embodiment 2

Embodiment 2 of the present invention describes a specific method of calculating the indication direction 522.

Figure 10:
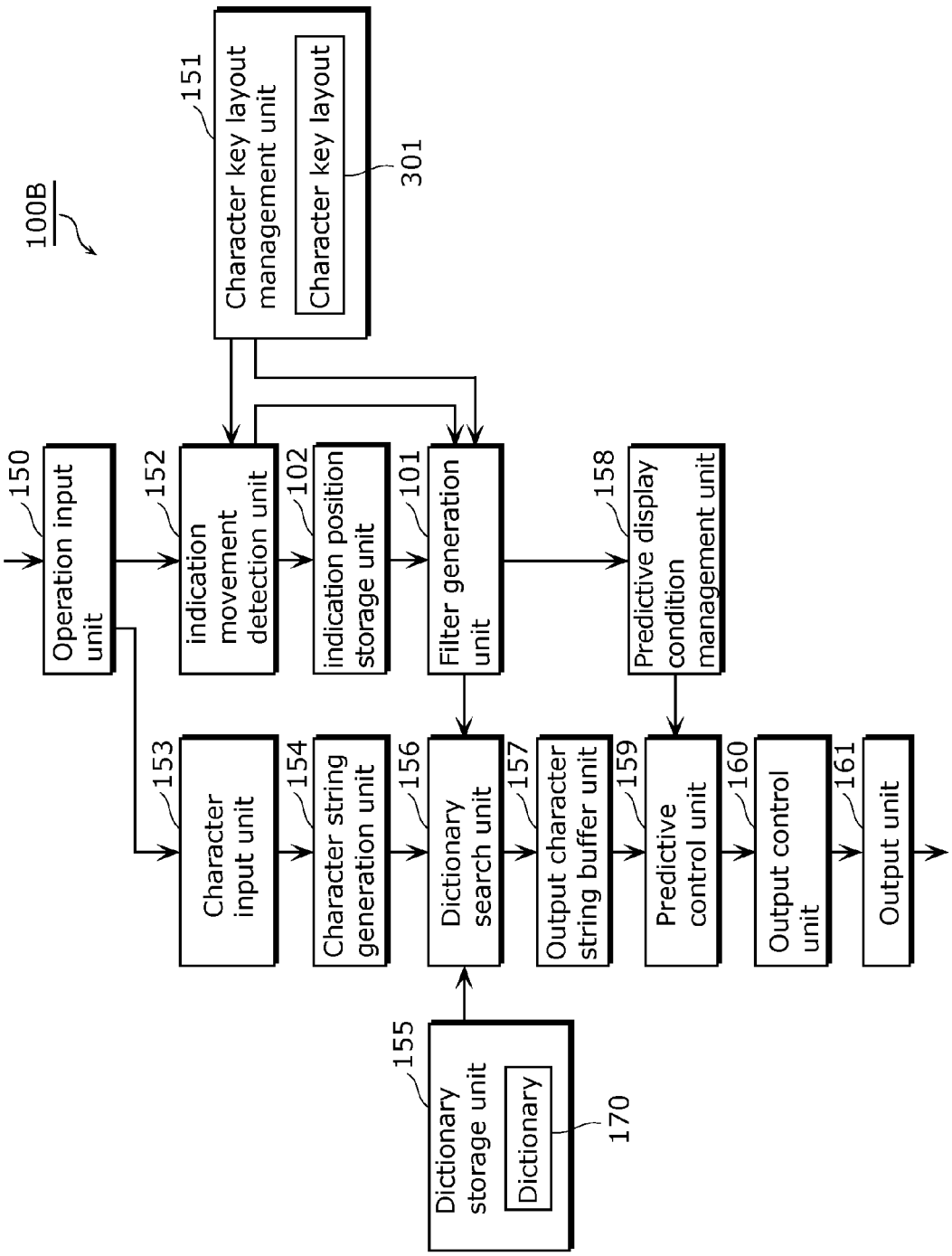
FIG. 10 is a block diagram of a character input prediction apparatus according to Embodiment 2 of the present invention.

FIG. 10 is a block diagram showing a structure of a character input prediction apparatus 100B according to Embodiment 2 of the present invention.

The character input prediction apparatus 100B shown in FIG. 10 further includes an indication position storage unit 102, in addition to the structure shown in FIG. 3. In FIG. 10, the same components as those in FIG. 3 are given the same reference signs.

FIG. 11A is a diagram showing an example of a character input operation situation using the character key layout display 501 in Embodiment 2 of the present invention.

The indication movement detection unit 152 detects the indication position 521 at predetermined time intervals.

The indication position storage unit 102 obtains the indication position 521 from the indication movement detection unit 152 and stores the obtained indication position 521 in sequence. When an indication starting point 721 is not held in the indication position storage unit 102, the indication position storage unit 102 holds the indication position 521 notified from the indication movement detection unit 152, as the indication starting point 721. The indication starting point 721 shows a start position of the character input operation by the user.

A coordinate Xa 731 shows the X-axis coordinate 502 of the indication starting point 721.

A coordinate Ya 732 shows the Y-axis coordinate 503 of the indication starting point 721.

FIG. 11B is a diagram showing a specific example of the indication position 521 in Embodiment 2 of the present invention. As shown in FIG. 11B, the indication position 521 further includes a time lapse 541. The coordinate Xb 531 and the coordinate Yb 532 are set for each time lapse 541. The time lapse 541 shows time progress of the character input operation.

FIG. 11C is a diagram showing a specific example of the indication starting point 721 in Embodiment 2 of the present invention. The indication starting point 721 includes the coordinate Xa 731 and the coordinate Ya 732.

When the indication starting point 721 is held in the indication position storage unit 102, the indication movement detection unit 152 determines the indication direction 522 from the indication starting point 721 held in the indication position storage unit 102 and the new indication position 521 detected by the indication movement detection unit 152. In detail, the indication movement detection unit 152 determines the indication direction 522 according to which direction the new indication position 521 is located in, relative to the indication starting point 721.

Here, instead of the indication movement detection unit 152 determining the indication direction 522, the filter generation unit 101 may directly predict the character range 523 from the indication starting point 721 and the new indication position 521.

For example, the filter generation unit 101 determines the character range condition 403 using a character range definition 401A held in the filter generation unit 101, the indication position 521, and the indication starting point 721.

FIG. 12 is a diagram showing an example of the character range definition 401A held in the filter generation unit 101. The character range definition 401A shown in FIG. 12 differs from the character range definition 401 shown in FIG. 6 in the definition of an indication direction 402A.

The character range definition 401A includes a plurality of indication directions 402A and the character range condition 403 corresponding to each of the plurality of indication directions 402A.

The indication direction 402A shows the direction of the character input operation by the user, and is determined by the indication starting point 721 and the indication position 521.

An operation flow of the character input prediction apparatus 100B in this case is described below.

Figure 13:
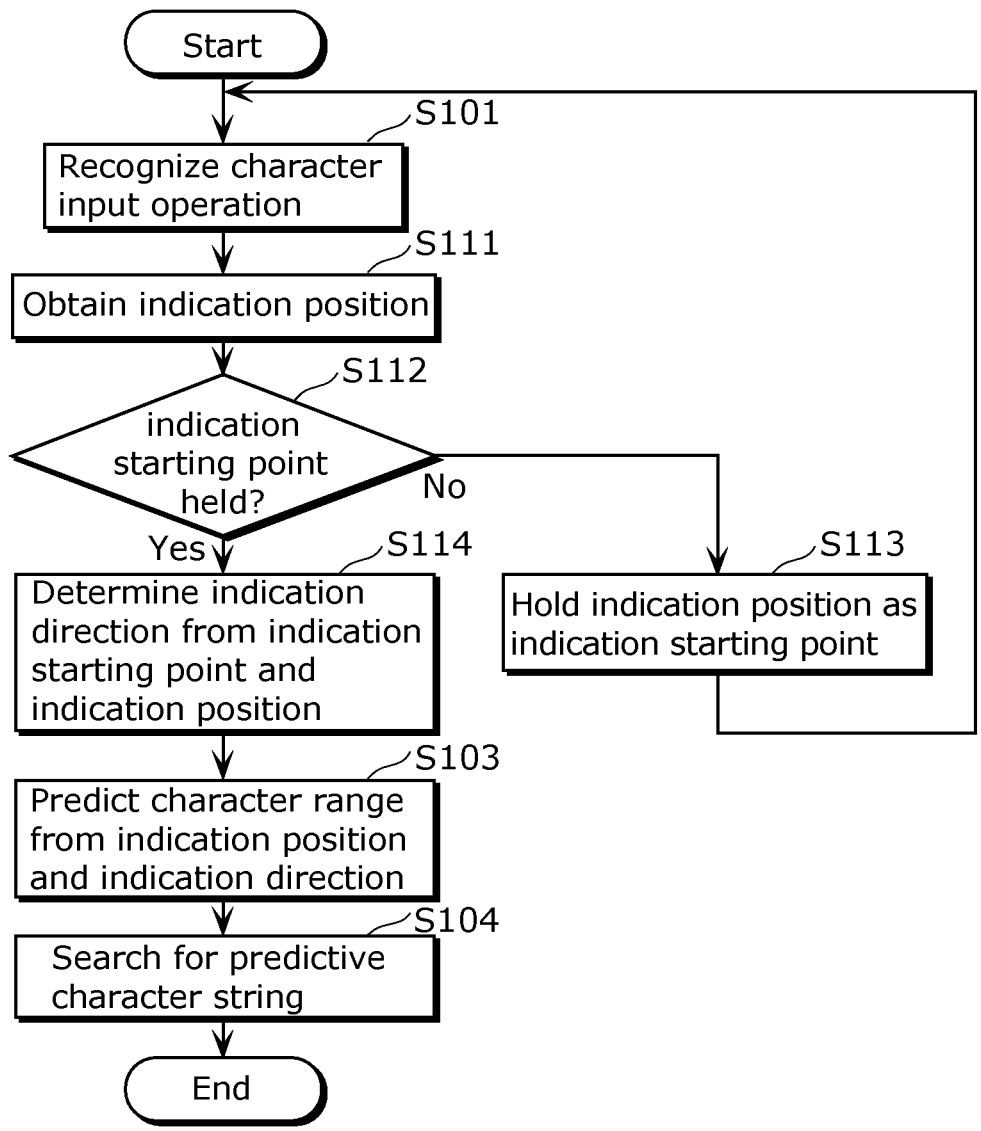
FIG. 13 is a flowchart of a character input prediction process according to Embodiment 2 of the present invention.

FIG. 13 is a flowchart of a character input prediction process by the character input prediction apparatus 100B. Steps S101, S103, and S104 shown in FIG. 13 are respectively the same as Steps S101, S103, and S104 shown in FIG. 2. Steps S111 to S114 shown in FIG. 13 are a specific example of Step S102 shown in FIG. 2.

After Step S101, the indication movement detection unit 152 obtains the indication position 521 based on the character input operation by the user (Step S111).

The indication movement detection unit 152 then determines whether or not the indication starting point 721 is held in the indication position storage unit 102 (Step S112).

In the case where the indication starting point 721 is not held (Step S112: No), the indication movement detection unit 152 causes the indication position storage unit 102 to hold the indication position 521 as the indication starting point 721 (Step S113), and goes to Step S101.

In the case where the indication starting point 721 is held (Step S112: Yes), on the other hand, the indication movement detection unit 152 determines the indication direction 522 from the indication position 521 and the indication starting point 721 (Step S114). After this, the filter generation unit 101 predicts the character range 523 using the indication position 521 and the indication direction 522 (Step S103).

The following describes the example shown in FIGS. 11A to 11C, as a specific example of the operation of the character input prediction apparatus 100B in the case of using the character range definition 401A shown in FIG. 12. In the example shown in FIGS. 11A to 11C, the coordinate Xb 531 and the coordinate Yb 532 of the indication position 521 when the time lapse 541 is "1" are respectively "800" and "300". This being the case, "800" and "300" are respectively set to the coordinate Xa 731 and the coordinate Ya 732 of the indication starting point 721.

After this, the position of the character input operation by the user moves. As a result, the coordinate Xb 531 and the coordinate Yb 532 of the indication position 521 when the time lapse 541 is "2" are respectively "700" and "300". The indication starting point 721 is already held at this time. Accordingly, the filter generation unit 101 determines the character range 523.

In detail, since the indication direction 402A is "coordinate Xa 731>coordinate Xb 531, coordinate Ya 732=coordinate Yb 532" in FIG. 12, the character range condition 403 is "(0, 0):(coordinate Xb 411, 500)". The filter generation unit 101 substitutes the coordinate Xb 531 (=700) for the coordinate Xb 411, thereby obtaining the character range condition 403 "(0, 0):(700, 500)". The filter generation unit 101 then determines, for each character 302, whether or not the character 302 is within a range of the character range condition 403 "(0, 0):(700, 500)", using the character range condition 403 "(0, 0):(700, 500)" and the layout position 303 in the character key layout 301.

The resulting character range 523 is "ta, chi, tsu, te, to, na, ni, nu, ne, no, ha, hi, fu, he, ho, ma, mi, mu, me, mo, ya, yu, yo, ra, ri, ru, re, ro, wa, wo, n, -".

As described above, the character input prediction apparatus 100B according to Embodiment 2 of the present invention can detect the appropriate indication direction 522 using the indication starting point 721.

Embodiment 3

Embodiment 3 of the present invention describes a method of determining the indication starting point 721 in detail.

The character input prediction apparatus 100 according to Embodiment 3 of the present invention has, for example, the same structure as shown in FIG. 10.

Figures 14A, 14B, 14C:
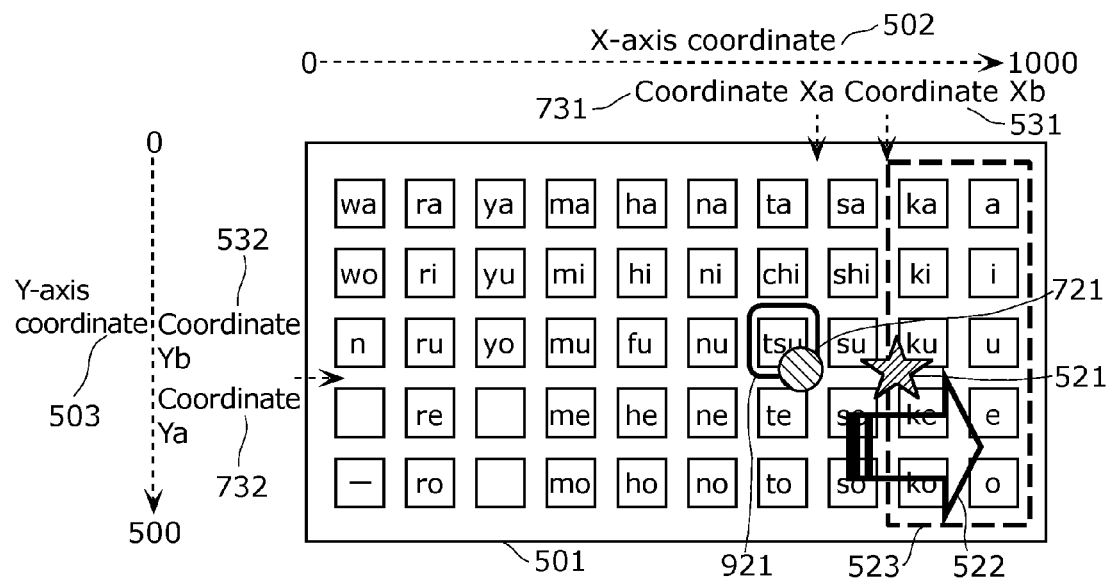
FIG. 14A is a diagram showing an operation example of a character input prediction apparatus according to Embodiment 3 of the present invention.
FIG. 14B is a diagram showing an example of an indication position according to Embodiment 3 of the present invention.
FIG. 14C is a diagram showing an example of an indication starting point according to Embodiment 3 of the present invention.

FIG. 14A is a diagram showing an example of a character input operation situation using the character key layout display 501 in Embodiment 3 of the present invention.

A character 921 shown in FIG. 14A is a character inputted by the user. In the example shown in FIG. 14A, the character 921 is "tsu".

FIG. 14B is a diagram showing a specific numerical example of the indication position 521 in this case.

FIG. 14C is a diagram showing a specific numerical example of the indication starting point 721 in this case. The indication starting point 721 shown in FIG. 14C further includes a time lapse 741. The coordinate Xa 731 and the coordinate Ya 732 are set for each time lapse 741. The time lapse 741 shows time progress of the update of the indication starting point 721 by character input.

When the indication starting point 721 is not held, the indication position storage unit 102 holds the indication position 521 notified from the indication movement detection unit 152, as the indication starting point 721. When the indication starting point 721 is held, upon input of a character by the user, the indication position storage unit 102 holds a position of a character key corresponding to the input character as the indication starting point 721. In detail, the indication movement detection unit 152 receives the character 302 from the character input unit 153. The indication movement detection unit 152 calculates, as the indication position 521, the position of the character key corresponding to the character 302, using the character key layout 301 and the character 302 received from the character input unit 153. The indication movement detection unit 152 causes the indication position storage unit 102 to hold the calculated indication position 521 as the indication starting point 721.

An operation flow of the character input prediction apparatus according to Embodiment 3 of the present invention is described below.

Figure 15:
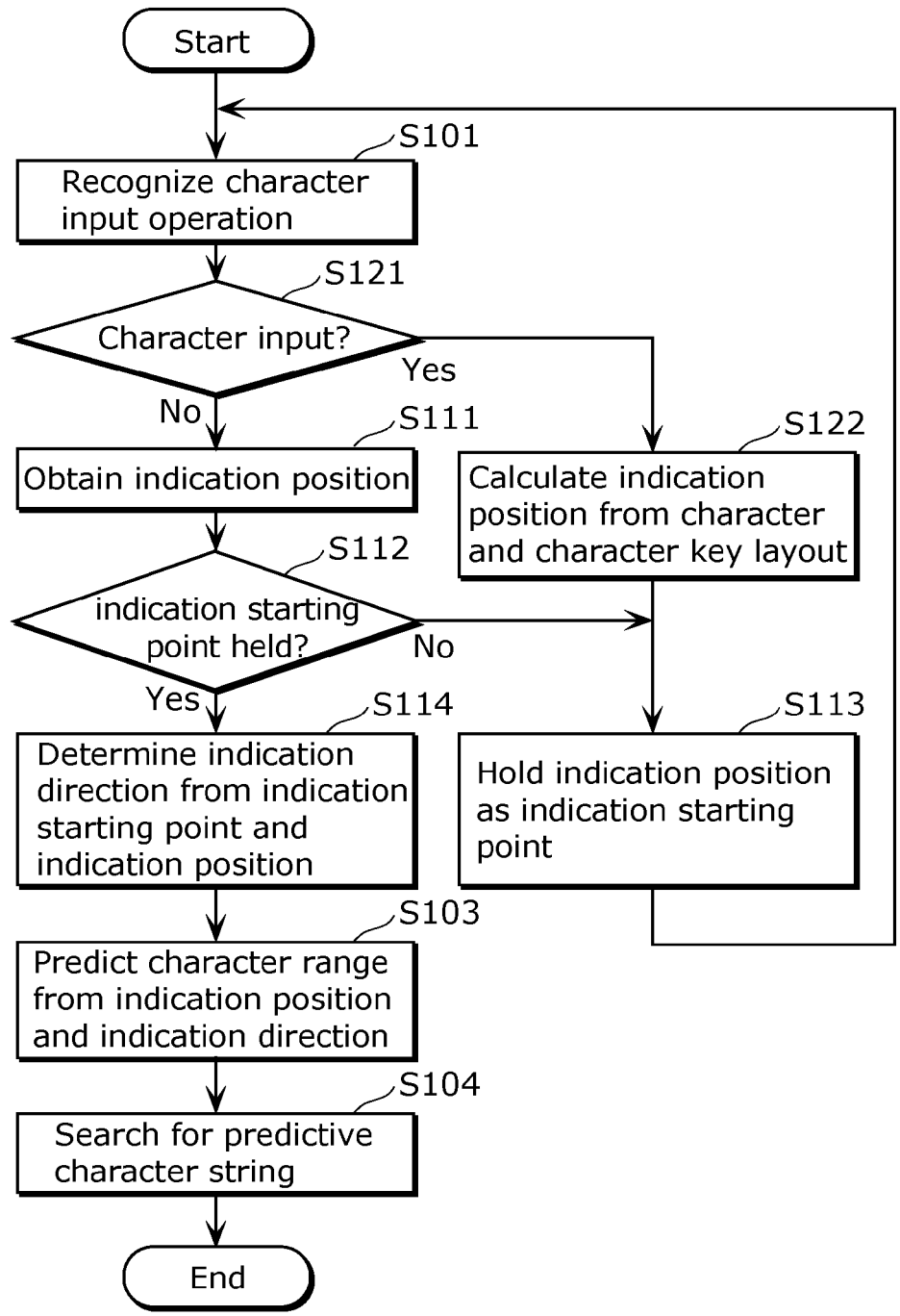
FIG. 15 is a flowchart of a character input prediction process according to Embodiment 3 of the present invention.

FIG. 15 is a flowchart of a character input prediction process by the character input prediction apparatus according to Embodiment 3 of the present invention. In the process shown in FIG. 15, Steps S121 and S122 are added to the process shown in FIG. 13.

After Step S101, the indication movement detection unit 152 determines whether or not the character 302 is inputted by the character input operation by the user (Step S121).

In the case where the character input operation information shows that the character is inputted (Step S121: Yes), the indication movement detection unit 152 calculates the indication position 521 using the information of the character received from the character input unit 153 and the character key layout 301 (Step S122). The indication movement detection unit 152 causes the indication position storage unit 102 to hold the indication position 521 calculated in Step S122 as the indication starting point 721 (Step S113), and goes to Step S101.

In the case where the character is not inputted (Step S121: No), on the other hand, the same process as in FIG. 13 is performed.

The following describes the example shown in FIGS. 14A to 14C, as a specific example of the operation of the character input prediction apparatus according to Embodiment 3 of the present invention. In the example shown in FIGS. 14A to 14C, the coordinate Xb 531 and the coordinate Yb 532 of the first indication position 521 when the time lapse 541 is "1" are respectively "800" and "300". This being the case, "800" and "300" are respectively set to the coordinate Xa 731 and the coordinate Ya 732 of the indication starting point 721 when the time lapse 741 is "1".

After this, the position of the character input operation by the user moves. As a result, the coordinate Xb 531 and the coordinate Yb 532 of the indication position 521 when the time lapse 541 is "2" are respectively "700" and "300".

The character "tsu" at the position of the movement destination is then selected by the character input operation by the user. When the character is inputted, the coordinate Xb 531 (=700) and the coordinate Yb 532 (=300) of the indication position 521 when the time lapse 541 is "2" are respectively set to the coordinate Xa 731 and the coordinate Ya 732 of the indication starting point 721 when the time lapse 741 is "2".

As a result of the next character input operation, the coordinate Xb 531 and the coordinate Yb 532 of the indication position 521 when the time lapse 541 is "3" are respectively "800" and "300".

The filter generation unit 101 determines the character range 523. In detail, since the indication direction 402A is "coordinate Xa 731<coordinate Xb 531, coordinate Ya 732=coordinate Yb 532" in FIG. 12, the character range condition 403 is "(coordinate Xb 411, 0):(1000, 500)". The filter generation unit 101 substitutes the coordinate Xb 531 (=800) for the coordinate Xb 411, thereby obtaining the character range condition 403 "(800, 0):(1000, 500)". The filter generation unit 101 then determines, for each character 302, whether or not the character 302 is within a range of the character range condition 403 "(800, 0):(1000, 500)", using the character range condition 403 "(800, 0):(1000, 500)" and the layout position 303 in the character key layout 301.

The resulting character range 523 is "a, i, u, e, o, ka, ki, ku, ke, ko".

As described above, the character input prediction apparatus according to Embodiment 3 of the present invention can determine the indication direction 522 with respect to the position of the inputted character key, with it being possible to detect the more appropriate indication direction 522.

Embodiment 4

Embodiment 4 of the present invention describes the case where the character input operation by the user is performed via arrow keys or the like. In such a character input operation, the indication direction 522 is limited to the vertical direction and the horizontal direction.

The character input prediction apparatus according to Embodiment 4 of the present invention has, for example, the same structure as shown in FIG. 10.

Figures 16A, 16B, 16C:
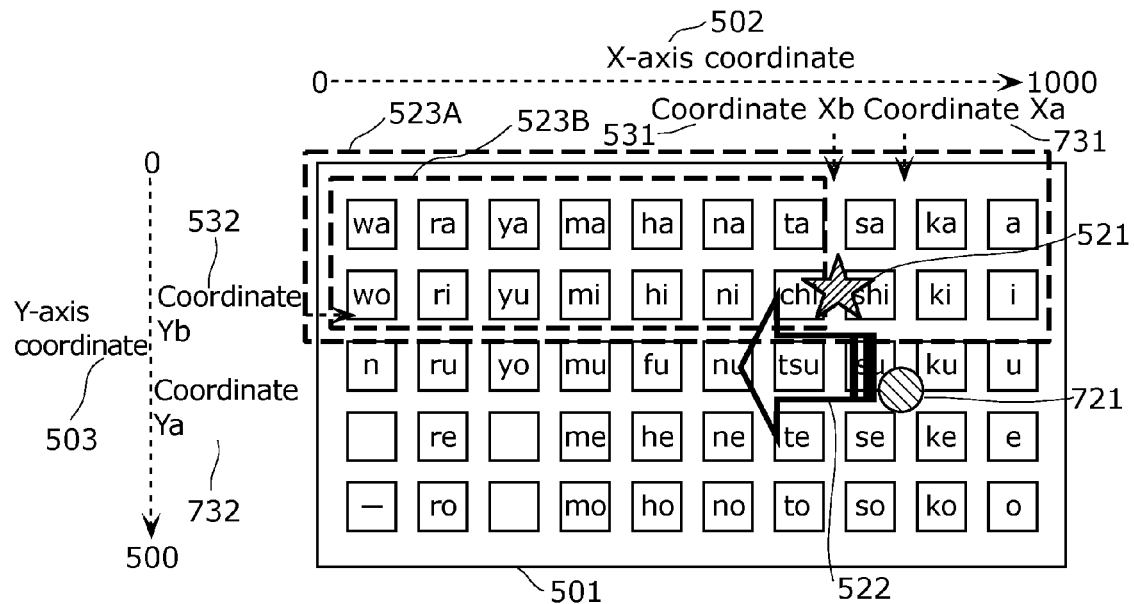
FIG. 16A is a diagram showing an operation example of a character input prediction apparatus according to Embodiment 4 of the present invention.
FIG. 16B is a diagram showing an example of an indication position according to Embodiment 4 of the present invention.
FIG. 16C is a diagram showing an example of an indication starting point according to Embodiment 4 of the present invention.

FIG. 16A is a diagram showing an example of a character input operation situation using the character key layout display 501 in this case. A character range 523A and a character range 523B each show a range of character positions predicted to be inputted by the user, and correspond to the above-mentioned character range 523.

FIG. 16B is a diagram showing a specific numerical example of the indication position 521 in this case. FIG. 16C is a diagram showing a specific numerical example of the indication starting point 721 in this case.

The following describes a specific example of the operation of the character input prediction apparatus 100, in the example shown in FIGS. 16A to 16C.

In the example shown in FIGS. 16A to 16C, the coordinate Xb 531 and the coordinate Yb 532 of the first indication position 521 when the time lapse 541 is "1" are respectively "800" and "300". The coordinate Xa 731 and the coordinate Ya 732 of the indication starting point 721 are respectively "800" and "300".

After this, the position of the character input operation moves vertically up, by the user operating the arrow keys. As a result, the coordinate Xb 531 and the coordinate Yb 532 of the indication position 521 when the time lapse 541 is "2" are respectively "800" and "200".

Since the indication direction 402A is "coordinate Xa 731=coordinate Xb 531, coordinate Ya 732>coordinate Yb 532", the character range condition 403 is "(0, 0):(1000, coordinate Yb 412)". The filter generation unit 101 substitutes the coordinate Yb 532 (=200) for the coordinate Yb 412, thereby obtaining the character range condition 403 "(0, 0): (1000, 200)". The filter generation unit 101 then determines the character range 523A.

In detail, the filter generation unit 101 determines, for each character 302, whether or not the character 302 is within a range of the character range condition 403 "(0, 0):(1000, 200)", using the character range condition 403 "(0, 0):(1000, 200)" and the layout position 303 in the character key layout 301.

The resulting character range 523A is "a, i, ka, ki, sa, shi, ta, chi, na, ni, ha, hi, ma, mi, ya, yu, ra, ri, wa, wo".

After this, the position of the character input operation moves horizontally left, by the user operating the arrow keys. As a result, the coordinate Xb 531 and the coordinate Yb 532 of the indication position 521 when the time lapse 541 is "3" are respectively "700" and "200".

Since the indication direction 402A is "coordinate Xa 731>coordinate Xb 531, coordinate Ya 732>coordinate Yb 532", the character range condition 403 is "(0, 0):(coordinate Xb 411, coordinate Yb 412)". The filter generation unit 101 substitutes the coordinate Xb 531 (=700) for the coordinate Xb 411 and the coordinate Yb 532 (=200) for the coordinate Yb 412, thereby obtaining the character range condition 403 "(0, 0):(700, 200)". The filter generation unit 101 then determines the character range 523B.

In detail, the filter generation unit 101 determines, for each character 302, whether or not the character 302 is within a range of the character range condition 403 "(0, 0):(700, 200)", using the character range condition 403 "(0, 0):(700, 200)" and the layout position 303 in the character key layout 301.

The resulting character range 523B is "ta, chi, na, ni, ha, hi, ma, mi, ya, yu, ra, ri, wa, WO".

As described above, the character input prediction apparatus according to Embodiment 4 of the present invention can also be applied to the case of using an input apparatus such as arrow keys.

Embodiment 5

Embodiment 2 of the present invention describes an example of calculating the indication direction 522 using the indication starting point 721. Embodiment 5 of the present invention describes another method of calculating the indication direction 522.

The character input prediction apparatus according to Embodiment 5 of the present invention calculates the indication direction 522 using a plurality of indication positions 521.

The character input prediction apparatus according to Embodiment 5 of the present invention has, for example, the same structure as shown in FIG. 10.

Figures 17A, 17B:
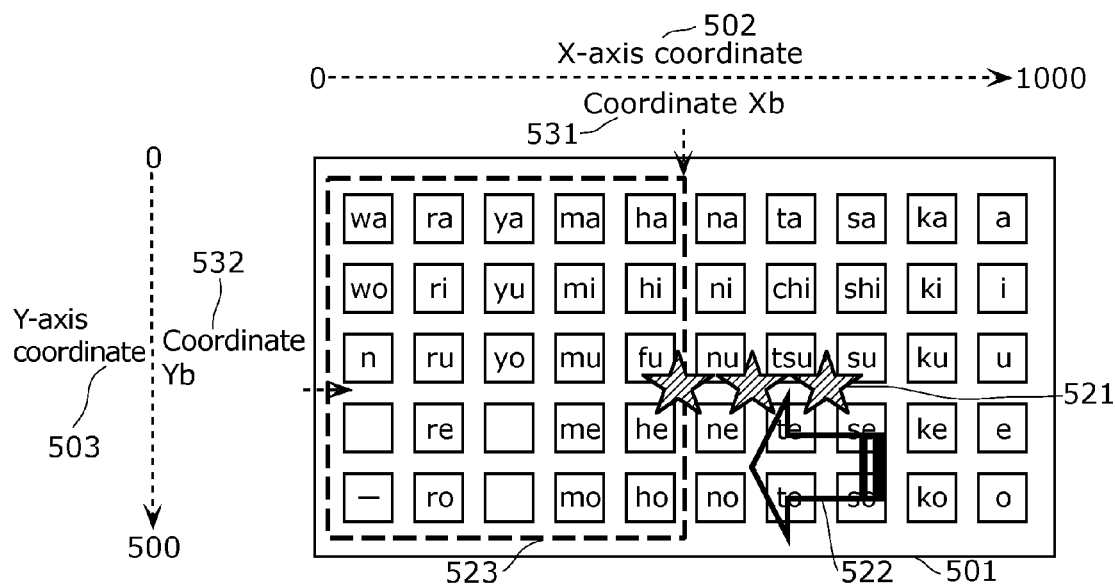
FIG. 17A is a diagram showing an operation example of a character input prediction apparatus according to Embodiment 5 of the present invention.
FIG. 17B is a diagram showing an example of an indication position according to Embodiment 5 of the present invention.

FIG. 17A is a diagram showing an example of a character input operation situation using the character key layout display 501 in Embodiment 5 of the present invention. FIG. 17B is a diagram showing a specific numerical example of the indication position 521 in Embodiment 5 of the present invention.

It is assumed here that the filter generation unit 101 uses the character range definition 401 shown in FIG. 6.

The indication movement detection unit 152 detects the indication position 521 at predetermined time intervals.

The indication position storage unit 102 holds a plurality of indication positions 521 detected by the indication movement detection unit 152.

The indication movement detection unit 152 calculates the indication direction 522 using the plurality of indication positions 521 held in the indication position storage unit 102. The filter generation unit 101 determines the character range condition 403 using the calculated indication direction 522.

The following describes a specific example of the operation of the character input prediction apparatus according to Embodiment 5 of the present invention, with reference to FIGS. 17A and 17B.

In the example shown in FIGS. 17A and 17B, the coordinate Xb 531 and the coordinate Yb 532 of the indication position 521 when the time lapse 541 is "1" are respectively "700" and "300". The coordinate Xb 531 and the coordinate Yb 532 of the indication position 521 when the time lapse 541 is "2" are respectively "600" and "300". The coordinate Xb 531 and the coordinate Yb 532 of the indication position 521 when the time lapse 541 is "3" are respectively "500" and "300".

The coordinate Xb 531 changes from "700" to "500" while the coordinate Yb 532 remains unchanged at "300", during the period of the time lapse 541 from "1" to "3". Accordingly, the indication movement detection unit 152 determines that the indication direction 522 is "horizontally left". That is, in the case where the three temporally-continuous indication positions 521 change in the same direction, the indication movement detection unit 152 determines the direction as the indication direction 522.

Since the indication direction 402 is the horizontally left 421, the character range condition 403 is "(0, 0):(coordinate Xb 411, 500)". The filter generation unit 101 substitutes the coordinate Xb 531 (=500) of the indication position 521 when the time lapse 541 is "3" for the coordinate Xb 411, thereby obtaining the character range condition 403 "(0, 0):(500, 500)".

The filter generation unit 101 then determines the character range 523. In detail, the filter generation unit 101 determines, for each character 302, whether or not the character 302 is within a range of the character range condition 403 "(0, 0):(500, 500)", using the character range condition 403 "(0, 0):(500, 500)" and the layout position 303 in the character key layout 301.

The resulting character range 523 is "ha, hi, fu, he, ho, ma, mi, mu, me, mo, ya, yu, yo, ra, ri, ru, re, ro, wa, wo, n, -".

As described above, the character input prediction apparatus according to Embodiment 5 of the present invention can detect the appropriate indication direction 522 using the plurality of indication positions 521.

Though the above describes the case where the indication movement detection unit 152 determines the indication direction 522 using three indication positions 521, the indication direction 522 may be determined using two indication positions 521 or four or more indication positions 521.

Embodiment 6

Embodiment 6 of the present invention describes an example of determining the character range 523 using a plurality of indication positions 521 and the indication starting point 721. In detail, Embodiment 6 of the present invention describes the case where such an operation that causes the indication position 521 to move in one direction and then return in the opposite direction is performed.

The character input prediction apparatus according to Embodiment 6 of the present invention has, for example, the same structure as shown in FIG. 10.

Figures 18A, 18B, 18C:
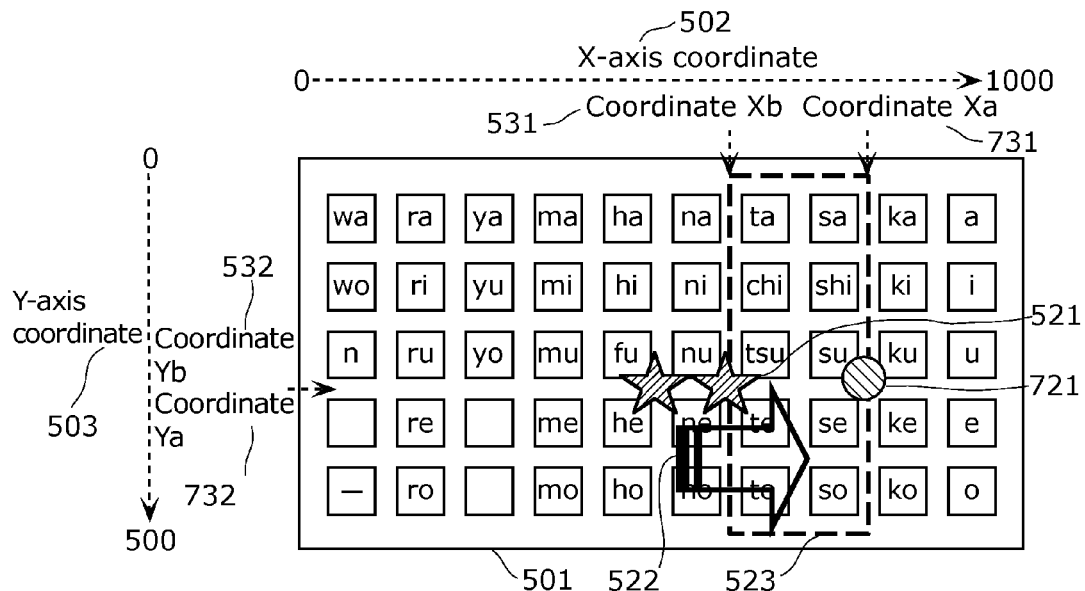
FIG. 18A is a diagram showing an operation example of a character input prediction apparatus according to Embodiment 6 of the present invention.
FIG. 18B is a diagram showing an example of an indication position according to Embodiment 6 of the present invention.
FIG. 18C is a diagram showing an example of an indication starting point according to Embodiment 6 of the present invention.

FIG. 18A is a diagram showing an example of a character input operation situation using the character key layout display 501 in Embodiment 6 of the present invention. FIG. 18B is a diagram showing a specific numerical example of the indication position 521 in Embodiment 6 of the present invention. FIG. 18C is a diagram showing a specific numerical example of the indication starting point 721 in Embodiment 6 of the present invention.

FIG. 19 is a diagram showing an example of a character range definition 401B held in the filter generation unit 101 in Embodiment 6 of the present invention.

As shown in FIGS. 18B and 18C, the indication position storage unit 102 holds a plurality of indication positions 521 detected by the indication movement detection unit 152. The indication position storage unit 102 also holds the indication starting point 721. The method of determining the indication starting point 721 is the same as that in Embodiment 2 or 3 described above.

The indication movement detection unit 152 determines the indication direction 522 using the plurality of indication positions 521 and the indication starting point 721 held in the indication position storage unit 102.

The filter generation unit 101 predicts the character range 523 using the indication direction 522, the most recent indication position 521, and the indication starting point 721 held in the indication position storage unit 102.

In detail, the filter generation unit 101 determines the character range condition 403 using the character range definition 401B held in the filter generation unit 101, the most recent indication position 521, and the indication starting point 721. In more detail, in the case where the position of the character input operation moves from the indication starting point 721 to a first indication position located in a first direction relative to the indication starting point 721 and then moves from the first indication position to a second indication position located in a second direction relative to the first indication position where the second direction is opposite to the first direction, the filter generation unit 101 determines a range between the indication starting point 721 and the second indication position, as the character range 523.

The filter generation unit 101 predicts the character range 523 by determining, for each character 302, whether or not the character 302 is within a range of the character range condition 403, using the character range condition 403 and the layout position 303 in the character key layout 301 held in the character key layout management unit 151.

The following describes a specific example of the operation of the character input prediction apparatus according to Embodiment 6 of the present invention.

In the example shown in FIGS. 18A to 18C, the coordinate Xb 531 and the coordinate Yb 532 of the indication position 521 when the time lapse 541 is "1" are respectively "800" and "300". The coordinate Xa 731 and the coordinate Ya 732 of the indication starting point 721 are respectively "800" and "300".

After this, the position of the character input operation moves horizontally left. As a result, the coordinate Xb 531 and the coordinate Yb 532 of the indication position 521 when the time lapse 541 is "2" are respectively "500" and "300".

After this, the position of the character input operation moves horizontally right. As a result, the coordinate Xb 531 and the coordinate Yb 532 of the indication position 521 when the time lapse 541 is "3" are respectively "600" and "300".

Thus, the coordinate Xb 531 changes from "800" to "500" and then to "600" while the coordinate Yb 532 remains unchanged at "300", during the period of the time lapse 541 from "1" to "3". Based on such a change of the indication position 521, the filter generation unit 101 determines that the position of the character input operation moves horizontally left and then returns toward the indication starting point 721. The filter generation unit 101 determines the character range condition 403 using the character range definition 401B shown in FIG. 19.

In detail, since the indication direction 402A is "coordinate Xa 731>coordinate Xb 531, coordinate Ya 732=coordinate Yb 532" in FIG. 19, the character range condition 403 is "(coordinate Xb 411, 0):(coordinate Xa 731, 500)". The filter generation unit 101 substitutes the coordinate Xb 531 (=600) for the coordinate Xb 411, thereby obtaining the character range condition 403 "(600, 0):(800, 500)".

The filter generation unit 101 then determines the character range 523. In detail, the filter generation unit 101 determines, for each character 302, whether or not the character 302 is within a range of the character range condition 403 "(600, 0):(800, 500)", using the character range condition 403 "(600, 0):(800, 500)" and the layout position 303 in the character key layout 301.

The resulting character range 523 is "sa, shi, su, se, so, ta, chi, tsu, te, to".

As described above, the character input prediction apparatus according to Embodiment 6 of the present invention can determine the appropriate character range 523 even in the case where such an operation that causes the indication position 521 to move in one direction and then return in the opposite direction is performed.

Embodiment 7

Embodiment 7 of the present invention describes an example of determining the character range 523 according to an indication speed which is a movement speed of the character input operation.

The character input prediction apparatus according to Embodiment 7 of the present invention has, for example, the same structure as shown in FIG. 10.

The indication position storage unit 102 holds a plurality of indication positions 521 detected by the indication movement detection unit 152.

The indication movement detection unit 152 calculates the indication speed which is the movement speed of the character input operation, from the plurality of indication positions 521.

The filter generation unit 101 predicts the character range 523 further using the indication speed.

Figures 20A, 20B:
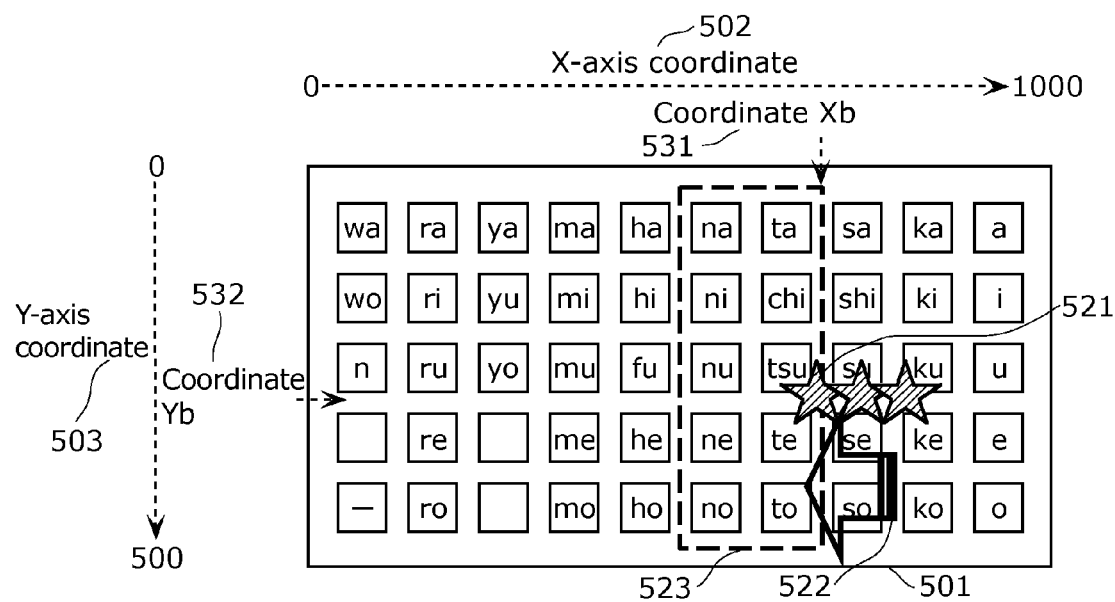
FIG. 20A is a diagram showing an operation example of a character input prediction apparatus according to Embodiment 7 of the present invention.
FIG. 20B is a diagram showing an example of an indication position according to Embodiment 7 of the present invention.

FIG. 20A is a diagram showing an example of a character input operation situation using the character key layout display 501 in Embodiment 7 of the present invention. FIG. 20B is a diagram showing a specific numerical example of the indication position 521 in Embodiment 7 of the present invention. Note that the time lapse 541 shows a time at which the corresponding indication position 521 is held. In other words, each indication position 521 is associated with the time at which the indication position 521 is held (detected).

FIG. 22 is a diagram showing an example of a character range definition 401C held in the filter generation unit 101 in Embodiment 7 of the present invention. The character range definition 401C relates to an example of limiting the character range 523 when the indication speed is less than a predetermined speed.

That is, in the case where the indication speed is less than the predetermined speed, the filter generation unit 101 uses the character range definition 401C shown in FIG. 22. In the case where the indication speed is more than the predetermined speed, the filter generation unit 101 uses, for example, the character range definition 401 shown in FIG. 6. In other words, in the case where the indication speed is less than the predetermined speed, the filter generation unit 101 determines a first range located in the indication direction with the most recent indication position 521 as the base point, as the character range 523. In the case where the indication speed is more than the predetermined speed, the filter generation unit 101 determines a second range located in the indication direction with the most recent indication position 521 as the base point, as the character range 523, where the second range is larger than the first range.

Though the use of one threshold is described here as an example, the filter generation unit 101 may use a plurality of thresholds. In such a case, the filter generation unit 101 may reduce the character range 523 when the indication speed is slower.

In detail, the filter generation unit 101 determines the character range condition 403, using the character range definition 401C held in the filter generation unit 101 and the indication direction 522. The filter generation unit 101 further predicts the character range 523 of character input by the user by determining, for each character 302, whether or not the character 302 is within a range of the character range condition 403, using the character range condition 403 and the layout position 303 in the character key layout 301 held in the character key layout management unit 151.

The following describes a specific example of the operation of the character input prediction apparatus according to Embodiment 7 of the present invention.

In the example shown in FIGS. 20A and 20B, the coordinate Xb 531 and the coordinate Yb 532 of the indication position 521 when the time lapse 541 is "1" are respectively "800" and "300". The coordinate Xb 531 and the coordinate Yb 532 of the indication position 521 when the time lapse 541 is "2" are respectively "750" and "300". The coordinate Xb 531 and the coordinate Yb 532 of the indication position 521 when the time lapse 541 is "3" are respectively "700" and "300".

In this case, the change of the coordinate Xb 531 during the period of the time lapse 541 from "1" to "3" is "100". Suppose, for example, the threshold for the change of the coordinate Xb 531 during the period of the time lapse 541 from "1" to "3" is "300". The filter generation unit 101 determines that the indication speed is less than the threshold. The filter generation unit 101 accordingly determines the character range condition 403 using the character range definition 401C.

Since the indication direction 402 is the horizontally left 421, the character range condition 403 is "((coordinate Xb 411)−200, 0):(coordinate Xb 411, 500)". The filter generation unit 101 substitutes the coordinate Xb 531 (=700) of the indication position 521 (when the time lapse 541 is "3") for the coordinate Xb 411, thereby obtaining the character range condition 403 "(500, 0):(700, 500)".

The filter generation unit 101 then determines the character range 523. In detail, the filter generation unit 101 determines, for each character 302, whether or not the character 302 is within a range of the character range condition 403 "(500, 0):(700, 500)", using the character range condition 403 "(500, 0):(700, 500)" and the layout position 303 in the character key layout 301.

The resulting character range 523 is "ta, chi, tsu, te, to, na, ni, nu, ne, no".

As described above, the character input prediction apparatus according to Embodiment 7 of the present invention can determine the more appropriate character range 523 using the movement speed of the character input operation. In the case where the indication speed is slow, there is a high possibility that the user intends to input a character located near the indication position 521. Therefore, in the case where the indication speed is slow, the character input prediction apparatus limits the character range 523 to a range near the indication position 521, with it being possible to reduce the number of predictive characters as candidates. This enables the user to easily select his/her intended character string.

Though the above describes the case where the indication speed is slow, the character range 523 may be limited in the case where the indication speed is fast. In detail, in the case where the indication speed is less than a second speed, the filter generation unit 101 determines a first range located in the indication direction with the most recent indication position 521 as the base point, as the character range 523. In the case where the indication speed is equal to or more than the second speed, the filter generation unit 101 determines a second range obtained by excluding, from the first range, a range that is included in the first range and is nearer the indication position 521, as the character range 523. In other words, the second range is a range apart from the indication position 521 in the indication direction.

Figure 21:
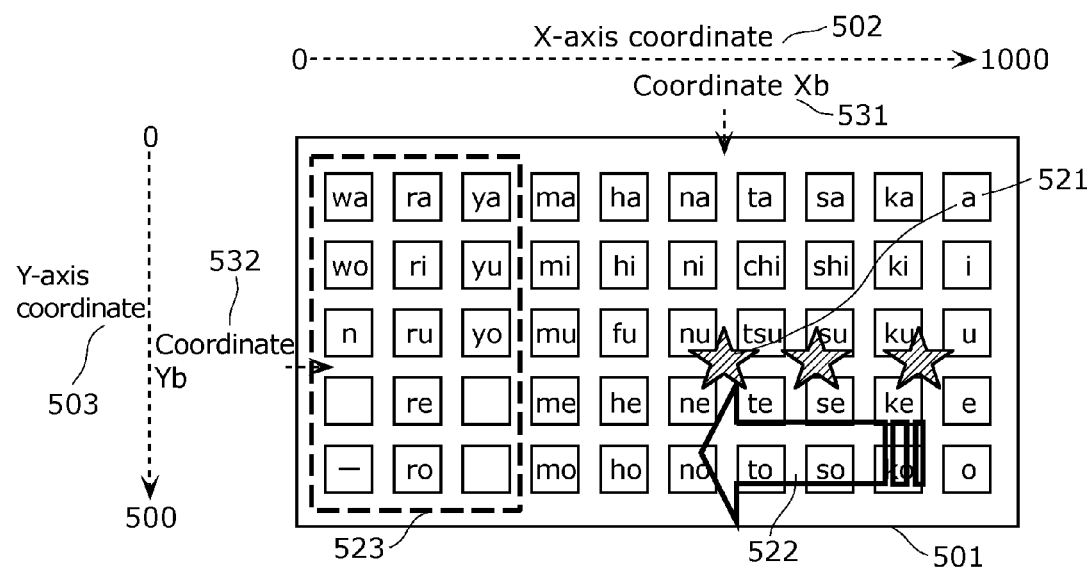
FIG. 21 is a diagram showing an operation example of the character input prediction apparatus according to Embodiment 7 of the present invention.

For example, in the case where the indication speed is fast, a range apart from the indication position 521 in the indication direction is determined as the character range 523, as shown in FIG. 21.

In the case where the indication speed is fast, there is a high possibility that the user intends to input a character located far from the indication position 521. Therefore, in the case where the indication speed is fast, the character input prediction apparatus limits the character range 523 to a range far from the indication position 521, with it being possible to reduce the number of predictive characters as candidates. This enables the user to easily select his/her intended character string.

Embodiment 8

Embodiment 8 of the present invention describes an example of determining the character range 523 using a movement angle of the character input operation.

The character input prediction apparatus according to Embodiment 8 of the present invention has, for example, the same structure as shown in FIG. 10.

The indication position storage unit 102 holds a plurality of indication positions 521 detected by the indication movement detection unit 152.

The indication movement detection unit 152 calculates not only the indication direction 522 but also an indication angle 533 which is an angle of the indication direction, from the plurality of indication positions 521.

The filter generation unit 101 predicts the character range 523 further using the indication angle 533.

Figures 23A, 23B:
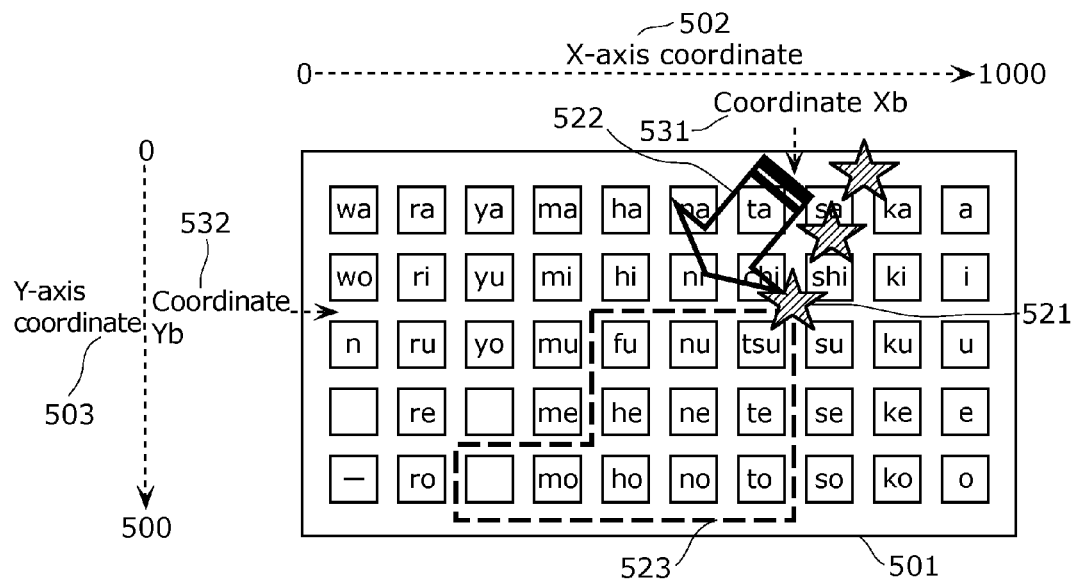
FIG. 23A is a diagram showing an operation example of a character input prediction apparatus according to Embodiment 8 of the present invention.
FIG. 23B is a diagram showing an example of an indication position according to Embodiment 8 of the present invention.

FIG. 23A is a diagram showing an example of a character input operation situation using the character key layout display 501 in Embodiment 8 of the present invention. FIG. 23B is a diagram showing a specific numerical example of the indication position 521 in Embodiment 8 of the present invention. As shown in FIG. 23B, the indication position 521 includes the indication angle 533 associated for each time lapse 541.

The filter generation unit 101 determines the character range 523 based on the indication direction 522 and the indication angle 533, with reference to a character range definition 401D.

FIG. 24 is a diagram showing an example of the character range definition 401D held in the filter generation unit 101 in Embodiment 8 of the present invention.

The character range definition 401D shown in FIG. 24 further includes an angle range 406. A reference range 407 and a deletion range 408 are associated for each indication direction 402 (for each diagonal direction of the indication direction 402 in this example). The deletion range 408 is set for each angle range 406. Each angle range 406 is a partial range obtained by dividing (classifying) an angle included in the corresponding indication direction 402 into a plurality of angle ranges. In the example shown in FIG. 24, a range more than 0 degree and less than 90 degrees of diagonally down left 424 is divided into three angle ranges that are a range more than 0 degree and less than 30 degrees, a range equal to or more than 30 degrees and equal to or less than 60 degrees, and a range more than 60 degrees and less than 90 degrees. The method of dividing the angle included in the corresponding indication direction 402 is not limited to this. For example, the angle may be divided into two or more angle ranges.

The filter generation unit 101 determines a range obtained by excluding the deletion range 408 of the angle range 406 including the indication angle from the reference range 407 corresponding to the indication direction 402, as the character range 523.

The following describes a specific example of the operation of the character input prediction apparatus according to Embodiment 8 of the present invention.

In the example shown in FIGS. 23A and 23B, the coordinate Xb 531 and the coordinate Yb 532 of the indication position 521 when the time lapse 541 is "1" are respectively "800" and "0". The coordinate Xb 531 and the coordinate Yb 532 of the indication position 521 when the time lapse 541 is "2" are respectively "750" and "100". The coordinate Xb 531 and the coordinate Yb 532 of the indication position 521 when the time lapse 541 is "3" are respectively "700" and "200".

In this case, the indication angle when the time lapse 541 is "2" and "3" is "63 degrees". The filter generation unit 101 determines the character range condition 403 using the character range definition 401D.

Since the indication direction 402 is the diagonally down left 424 and the indication angle is "63 degrees", the character range condition 403 of the reference range 407 is "((coordinate Xb 411)−500, coordinate Yb 412):(coordinate Xb 411, 500)". The filter generation unit 101 substitutes the coordinate Xb 531 (=700) and the coordinate Yb 532 (=200) of the indication position 521 (when the time lapse 541 is "3") respectively for the coordinate Xb 411 and the coordinate Yb 412, thereby obtaining the character range condition 403 "(200, 200):(700, 500)" of the reference range 407.

Moreover, the character range condition 403 of the deletion range 408 is "((coordinate Xb 411)−500, coordinate Yb 412): ((coordinate Xb 411)−300, (coordinate Yb)+200)". The filter generation unit 101 substitutes the coordinate Xb 531 (=700) and the coordinate Yb 532 (=200) of the indication position 521 (when the time lapse 541 is "3") respectively for the coordinate Xb 411 and the coordinate Yb 412, thereby obtaining the character range condition 403 "(200, 200):(400, 400)" of the deletion range 408.

The filter generation unit 101 then determines the character range 523.

In detail, the filter generation unit 101 determines, for each character 302, whether or not the character 302 is within a range of the character range condition 403 "(200, 200):(700, 500)" of the reference range 407, using the character range condition 403 "(200, 200):(700, 500)" of the reference range 407 and the layout position 303 in the character key layout 301.

The resulting reference range 407 is "tsu, te, to, nu, ne, no, fu, he, ho, mu, me, mo, yo".

The filter generation unit 101 further determines, for each character 302, whether or not the character 302 is within a range of the character range condition 403 "(200, 200):(400, 400)" of the deletion range 408, using the character range condition 403 "(200, 200):(400, 400)" of the deletion range 408 and the layout position 303 in the character key layout 301.

The resulting deletion range 408 is "mu, me, yo".

The filter generation unit 101 determines the character range 523, by excluding the characters included in the deletion range 408 from the characters included in the reference range 407. The resulting character range 523 is "tsu, te, to, nu, ne, no, fu, he, ho, mo".

The following describes other operation examples with reference to FIGS. 25A, 25B, 26A, and 26B.

Figures 25A, 25B:
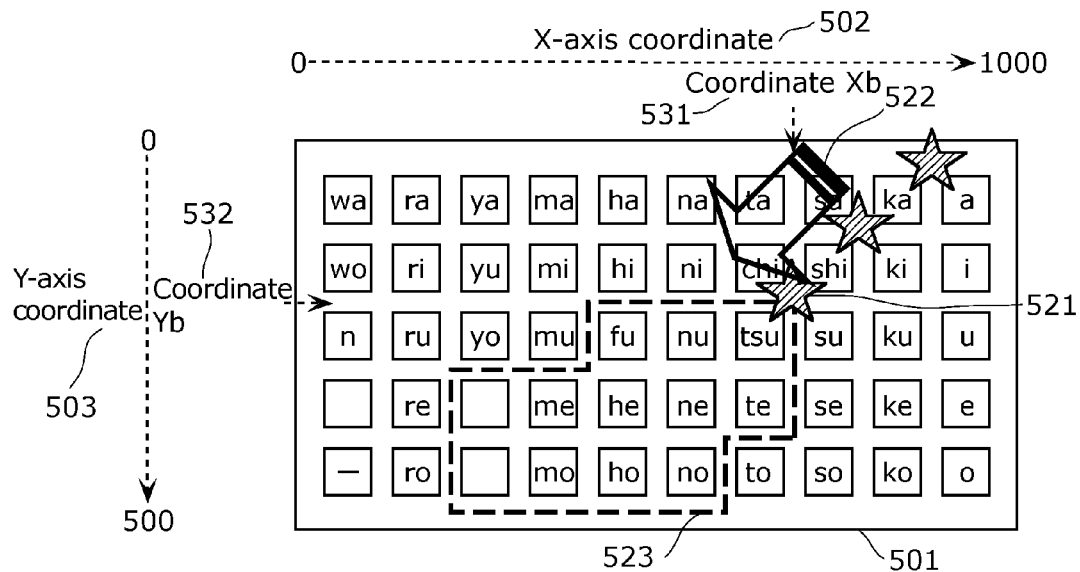
FIG. 25A is a diagram showing an operation example of the character input prediction apparatus according to Embodiment 8 of the present invention.
FIG. 25B is a diagram showing an example of an indication position according to Embodiment 8 of the present invention.

FIG. 25A is a diagram showing an example of a character input operation situation using the character key layout display 501 in Embodiment 8 of the present invention. FIG. 25B is a diagram showing a specific numerical example of the indication position 521 in Embodiment 8 of the present invention.

Since the indication direction 402 is the diagonally down left 424 and the indication angle is "45 degrees", the character range condition 403 of the reference range 407 is "(200, 200):(700, 500)", as in the case of FIGS. 23A and 23B.

Moreover, the character range condition 403 of the deletion range 408 is "((coordinate Xb 411)−100, 400):(coordinate Xb 411, 500)" and "((coordinate Xb 411)−500, coordinate Yb 412):((coordinate Xb 411)−300, (coordinate Yb)+100)". The filter generation unit 101 substitutes the coordinate Xb 531 (=700) and the coordinate Yb 532 (=200) of the indication position 521 (when the time lapse 541 is "3") respectively for the coordinate Xb 411 and the coordinate Yb 412, thereby obtaining the character range condition 403 "(600, 400):(700, 500)" and "(200, 200):(400, 300)" of the deletion range 408.

The filter generation unit 101 then determines the character range 523.

In detail, the reference range 407 is "tsu, te, to, nu, ne, no, fu, he, ho, mu, me, mo, yo", as in the case of FIGS. 23A and 23B.

The filter generation unit 101 further determines, for each character 302, whether or not the character 302 is within a range of the character range condition 403 "(600, 400):(700, 500)" and "(200, 200):(400, 300)" of the deletion range 408, using the character range condition 403 "(600, 400):(700, 500)" and "(200, 200):(400, 300)" of the deletion range 408 and the layout position 303 in the character key layout 301.

The resulting deletion range 408 is "to, yo, mu".

The filter generation unit 101 determines the character range 523, by excluding the characters included in the deletion range 408 from the characters included in the reference range 407. The resulting character range 523 is "tsu, te, nu, ne, no, fu, he, ho, me, mo".

Figures 26A, 26B:
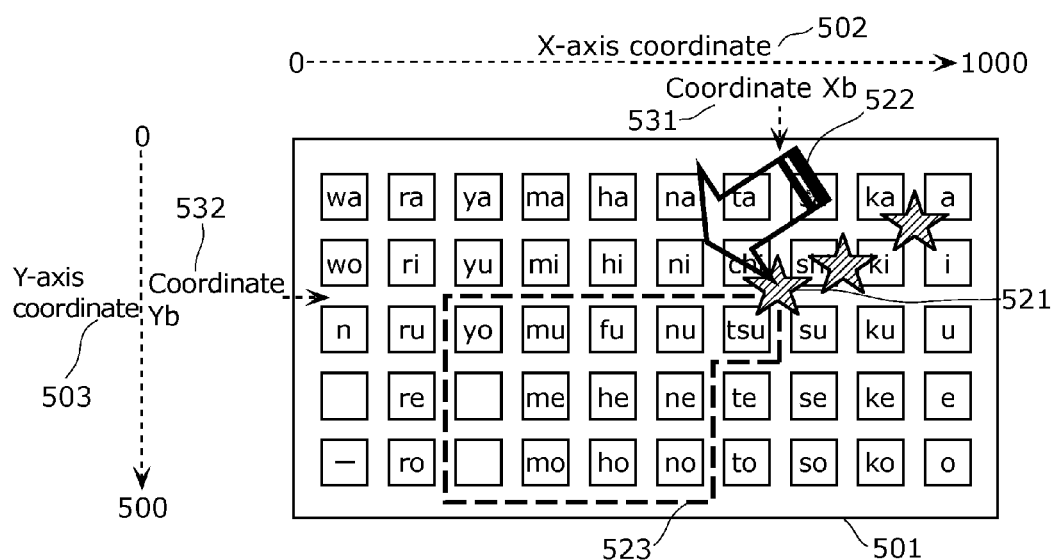
FIG. 26A is a diagram showing an operation example of the character input prediction apparatus according to Embodiment 8 of the present invention.
FIG. 26B is a diagram showing an example of an indication position according to Embodiment 8 of the present invention.

FIG. 26A is a diagram showing an example of a character input operation situation using the character key layout display 501 in Embodiment 8 of the present invention. FIG. 26B is a diagram showing a specific numerical example of the indication position 521 in Embodiment 8 of the present invention.

Since the indication direction 402 is the diagonally down left 424 and the indication angle is "26 degrees", the character range condition 403 of the reference range 407 is "(200, 200):(700, 500)", as in the case of FIGS. 23A and 23B.

Moreover, the character range condition 403 of the deletion range 408 is "((coordinate Xb 411)–100, (coordinate Yb 412)+100):(coordinate Xb 411, 500)". The filter generation unit 101 substitutes the coordinate Xb 531 (=700) and the coordinate Yb 532 (=200) of the indication position 521 (when the time lapse 541 is "3") respectively for the coordinate Xb 411 and the coordinate Yb 412, thereby obtaining the character range condition 403 "(600, 300):(700, 500)" of the deletion range 408.

The filter generation unit 101 then determines the character range 523.

In detail, the reference range 407 is "tsu, te, to, nu, ne, no, fu, he, ho, mu, me, mo, yo", as in the case of FIGS. 23A and 23B.

The filter generation unit 101 further determines, for each character 302, whether or not the character 302 is within a range of the character range condition 403 "(600, 300):(700, 500)" of the deletion range 408, using the character range condition 403 "(600, 300):(700, 500)" of the deletion range 408 and the layout position 303 in the character key layout 301.

The resulting deletion range 408 is "te, to".

The filter generation unit 101 determines the character range 523, by excluding the characters included in the deletion range 408 from the characters included in the reference range 407. The resulting character range 523 is "tsu, nu, ne, no, fu, he, ho, mu, me, mo, yo".

As described above, the character input prediction apparatus according to Embodiment 8 of the present invention can determine the more appropriate character range 523 using the movement angle of the character input operation.

Embodiment 9

Embodiment 9 of the present invention describes displayed prediction result update timings.

Figures 27A, 27B, 27C:
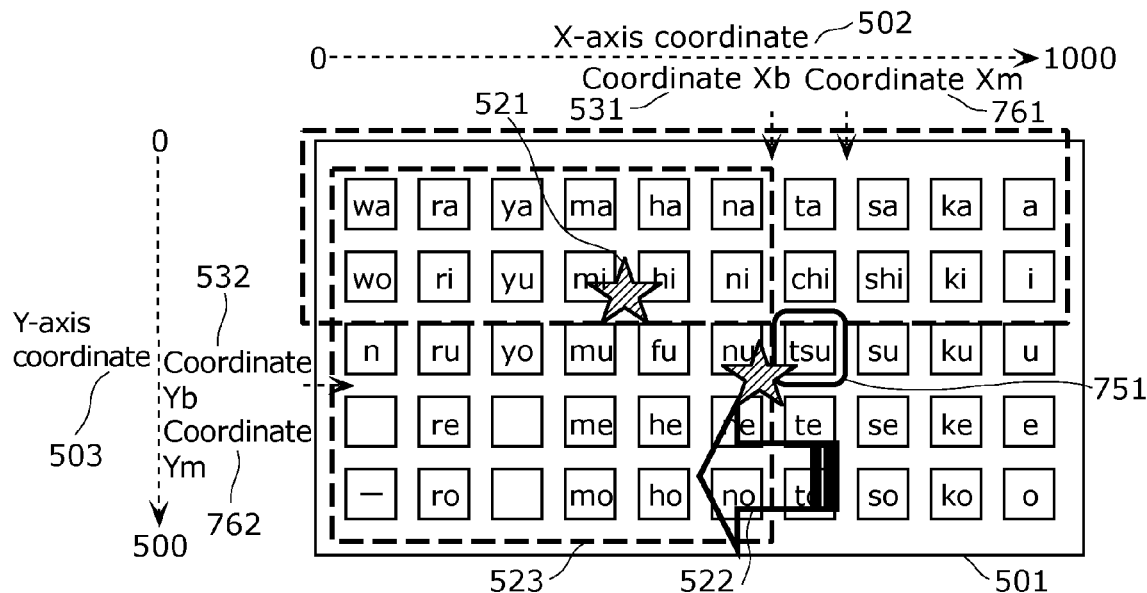
FIG. 27A is a diagram showing an operation example of a character input prediction apparatus according to Embodiment 9 of the present invention.
FIG. 27B is a diagram showing an example of an indication position according to Embodiment 9 of the present invention.
FIG. 27C is a diagram showing an example of an input character position according to Embodiment 9 of the present invention.

FIG. 27A is a diagram showing an example of a character input operation situation using the character key layout display 501 in Embodiment 9 of the present invention.

An input character position 751 shows a character inputted by the user. In the example shown in FIG. 27A, the input character is "tsu".

FIG. 27B is a diagram showing a specific numerical example of the indication position 521 in Embodiment 9 of the present invention.

FIG. 27C is a diagram showing a specific numerical example of the input character position 751 in Embodiment 9 of the present invention. A coordinate Xm 761 shows an X-axis coordinate of the input character position 751. A coordinate Ym 762 shows a Y-axis coordinate of the input character position 751.

In the example shown in FIGS. 27A to 27C, the coordinate Xb 531 and the coordinate Yb 532 of the indication position 521 when the time lapse 541 is "1" are respectively "700" and "300". Moreover, the character "tsu" at this indication position 521 is inputted.

At this time, for example, the input character prediction apparatus according to Embodiment 9 of the present invention displays each character string whose starting character in pronunciation is "tsu", from among the plurality of candidate character strings stored in the dictionary storage unit 155.

As a result of the next character input operation, the coordinate Xb 531 and the coordinate Yb 532 of the indication position 521 when the time lapse 541 is "2" are respectively "600" and "300".

Since the indication direction 402 is the horizontally left 421, the character range condition 403 is "(0, 0):(coordinate Xb 411, 500)". The filter generation unit 101 substitutes the coordinate Xb 531 (=600) for the coordinate Xb 411, thereby obtaining the character range condition 403 "(0, 0):(600, 500)".

The filter generation unit 101 then determines the character range 523. In detail, the filter generation unit 101 determines, for each character 302, whether or not the character 302 is within a range of the character range condition 403 "(0, 0):(600, 500)", using the character range condition 403 "(0, 0):(600, 500)" and the layout position 303 in the character key layout 301.

The resulting character range 523 is "na, ni, nu, ne, no, ha, hi, fu, he, ho, ma, mi, mu, me, mo, ya, yu, yo, ra, ri, ru, re, ro, wa, wo, n, -". The number of characters included in the character range 523 is "27".

As a result of the next character input operation, the coordinate Xb 531 and the coordinate Yb 532 of the indication position 521 when the time lapse 541 is "3" are respectively "500" and "300".

Since the indication direction 402 is the horizontally left 421, the character range condition 403 is "(0, 0):(coordinate Xb 411, 500)". The filter generation unit 101 substitutes the coordinate Xb 531 (=500) for the coordinate Xb 411, thereby obtaining the character range condition 403 "(0, 0):(500, 500)".

The filter generation unit 101 then determines the character range 523. In detail, the filter generation unit 101 determines, for each character 302, whether or not the character 302 is within a range of the character range condition 403 "(0, 0):(500, 500)", using the character range condition 403 "(0, 0):(500, 500)" and the layout position 303 in the character key layout 301.

The resulting character range 523 is "ha, hi, fu, he, ho, ma, mi, mu, me, mo, ya, yu, yo, ra, ri, ru, re, ro, wa, wo, n, -". The number of characters included in the character range 523 is "22".

The filter generation unit 101 compares the number of characters included in the character range 523, between when the time lapse 541 is "2" and when the time lapse 541 is "3". In the case where there is little influence on the displayed character strings, the filter generation unit 101 does not use the character range 523 when the time lapse 541 is "3", for the display condition used by the predictive display condition management unit 158. That is, the filter generation unit 101 does not update the character range 523.

In detail, for example the filter generation unit 101 does not update the character range 523 in the case where the change in the number of characters included in the character range 523 is less than a predetermined threshold, and updates the character range 523 in the case where the change in the number of characters is more than the threshold. Alternatively, the filter generation unit 101 may not update the character range 523 in the case where the change in the characters included in the character range 523 is less than a predetermined threshold, and update the character range 523 in the case where the change in the characters is more than the threshold. The change in the characters mentioned here denotes the number of characters included in only one of the new character range 523 and the immediately previous character range 523. Alternatively, the filter generation unit 101 may not update the character range 523 in the case where the change in the predictive character strings eventually displayed is less than a predetermined threshold, and update the character range 523 in the case where the change in the predictive character strings is more than the threshold. The change in the predictive character strings mentioned here denotes the number of predictive character strings included in only one of the new predictive character string group and the immediately previous predictive character string group. The filter generation unit 101 may use any combination of the plurality of criteria mentioned above.

After this, the coordinate Xb 531 and the coordinate Yb 532 of the indication position 521 when the time lapse 541 is "4" are respectively "400" and "200". Here, the indication direction 522 is "vertically up". Since the indication direction 402 is vertically up 422, the character range condition 403 is "(0, 0):(1000, coordinate Yb 412)". The filter generation unit 101 substitutes the coordinate Yb 532 (=200) for the coordinate Yb 412, thereby obtaining the character range condition 403 "(0, 0):(1000, 200)".

The filter generation unit 101 then determines the character range 523. In detail, the filter generation unit 101 determines, for each character 302, whether or not the character 302 is within a range of the character range condition 403 "(0, 0):(1000, 200)", using the character range condition 403 "(0, 0):(1000, 200)" and the layout position 303 in the character key layout 301.

The resulting character range 523 is "a, i, ka, ki, sa, shi, ta, chi, na, ni, ha, hi, ma, mi, ya, yu, ra, ri, wa, wo". The number of characters included in the character range 523 is "20".

The filter generation unit 101 compares the number of characters included in the character range 523, between when the time lapse 541 is "2" and when the time lapse 541 is "4". Here, the filter generation unit 101 determines that there is influence on the displayed character strings, and uses the character range 523 when the time lapse 541 is "4", for the display condition used by the predictive display condition management unit 158.

The following describes a specific display example of the character input prediction apparatus according to Embodiment 9 of the present invention.

Figure 28:
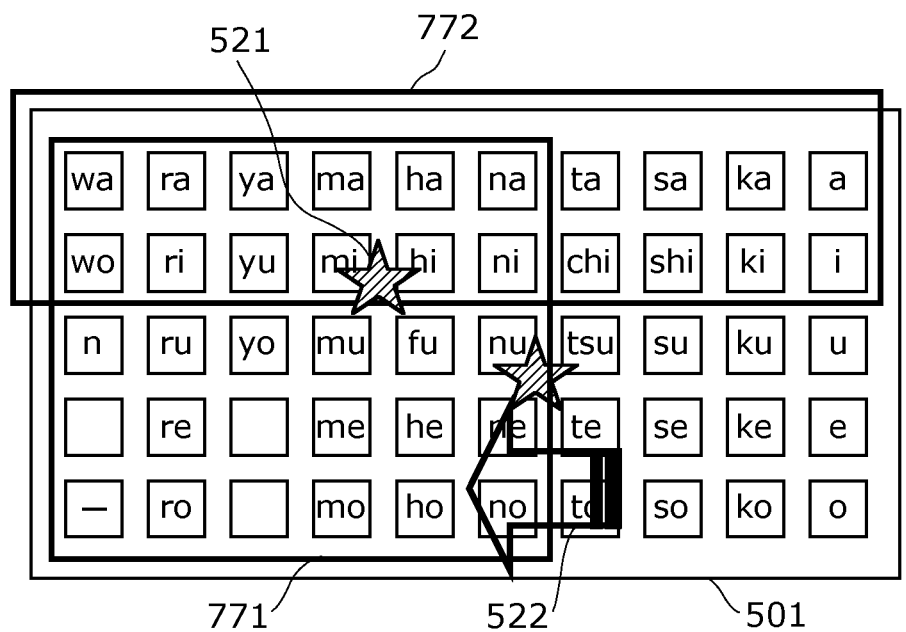
FIG. 28 is a diagram showing a display example of the character input prediction apparatus according to Embodiment 9 of the present invention.

FIG. 28 is a diagram showing a display example of the character key layout display 501 in Embodiment 9 of the present invention.

Character range displays 771 and 772 shown in FIG. 28 are each a frame for the character range 523 predicted from the character input operation by the user, which is displayed on the character key layout display 501.

In the example shown in FIGS. 27A to 27C, when the time lapse 541 is "2", the character range display 771 is displayed. When the time lapse 541 is "3", the character range display 771 is not updated. When the time lapse 541 is "4", the character range display 772 is displayed.

By displaying the character range 523 on the character key layout display 501 in such a manner, the current character range 523 can be presented to the user. This contributes to improved user operability.

The following describes a predictive character string display method.

Figure 29:
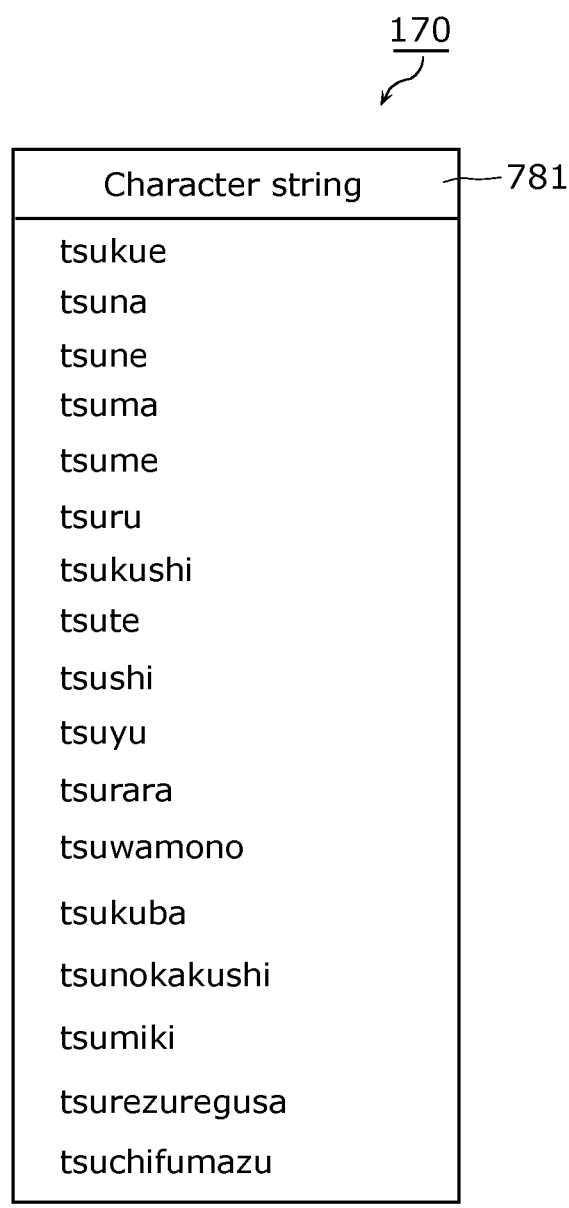
FIG. 29 is a diagram showing an example of character strings included in a dictionary according to Embodiment 9 of the present invention.

FIG. 29 is a diagram showing an example of the dictionary 170 stored in the dictionary storage unit 155 in Embodiment 9 of the present invention. The dictionary 170 includes a plurality of candidate character strings 781. Retrieved character strings whose starting character in pronunciation is "tsu" are shown in FIG. 29 as an example.

FIG. 30 is a diagram showing an example of a state where the retrieved character strings are displayed by the output unit 161 in Embodiment 9 of the present invention. A display example when the character "tsu" is inputted is shown in FIG. 30, with the retrieved character strings whose starting character in pronunciation is "tsu" being displayed in a display area 782.

Figure 31:
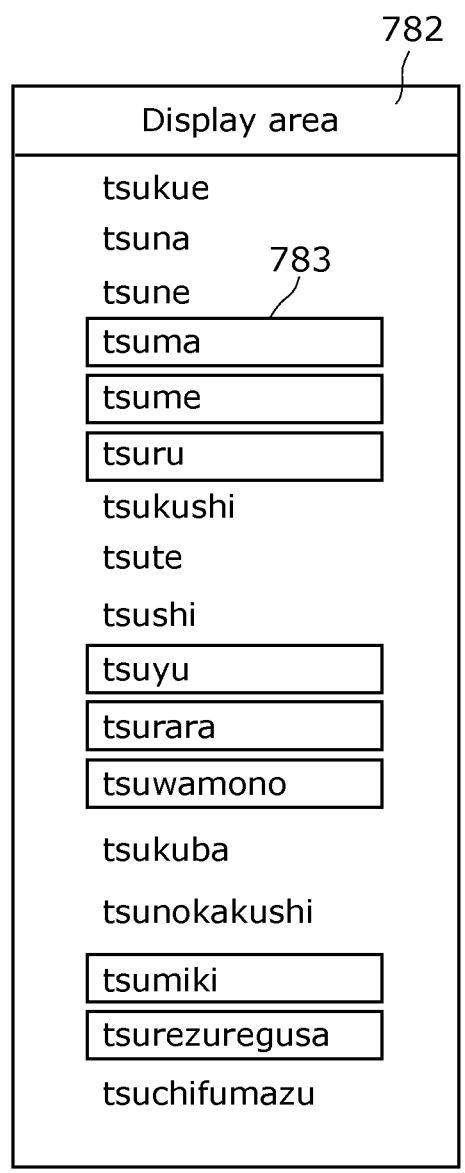
FIG. 31 is a diagram showing an example of the display area according to Embodiment 9 of the present invention.

FIG. 31 is a diagram showing an example of a state where the retrieved character strings are displayed by the output unit 161 in Embodiment 9 of the present invention. A display example after the character range 523 is determined is shown in FIG. 31. An acknowledge display 783 shown in FIG. 31 is used to highlight each predictive character string that includes a predictive character included in the character range 523. Here, each predictive character string that includes a predictive character following the starting character "tsu" is highlighted. This enables the user to recognize the prediction status appropriately.

The following describes an example in the case of English input.

Figure 32:
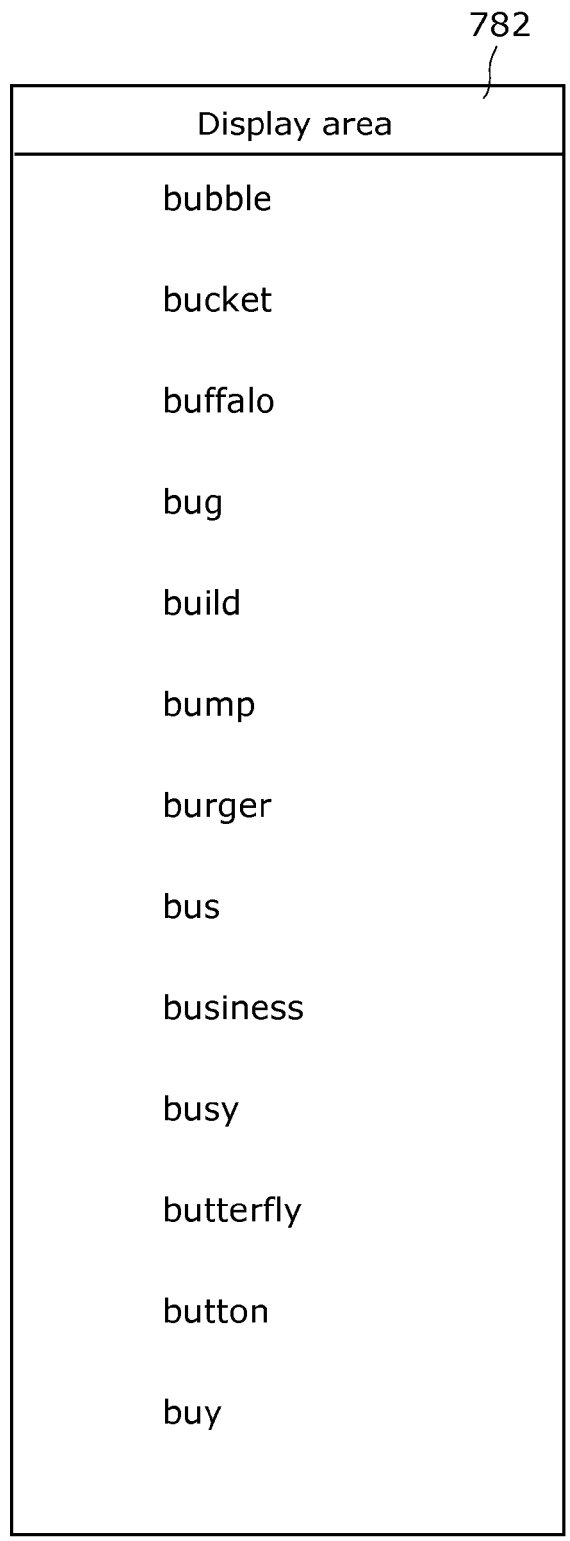
FIG. 32 is a diagram showing an example of the display area according to Embodiment 9 of the present invention.

FIG. 32 is a diagram showing an example of a state where retrieved character strings are displayed by the output unit 161 in Embodiment 9 of the present invention. A display example when the character string "bu" is inputted is shown in FIG. 32, with retrieved character strings whose starting character string is "bu" being displayed in the display area 782.

Figure 33:
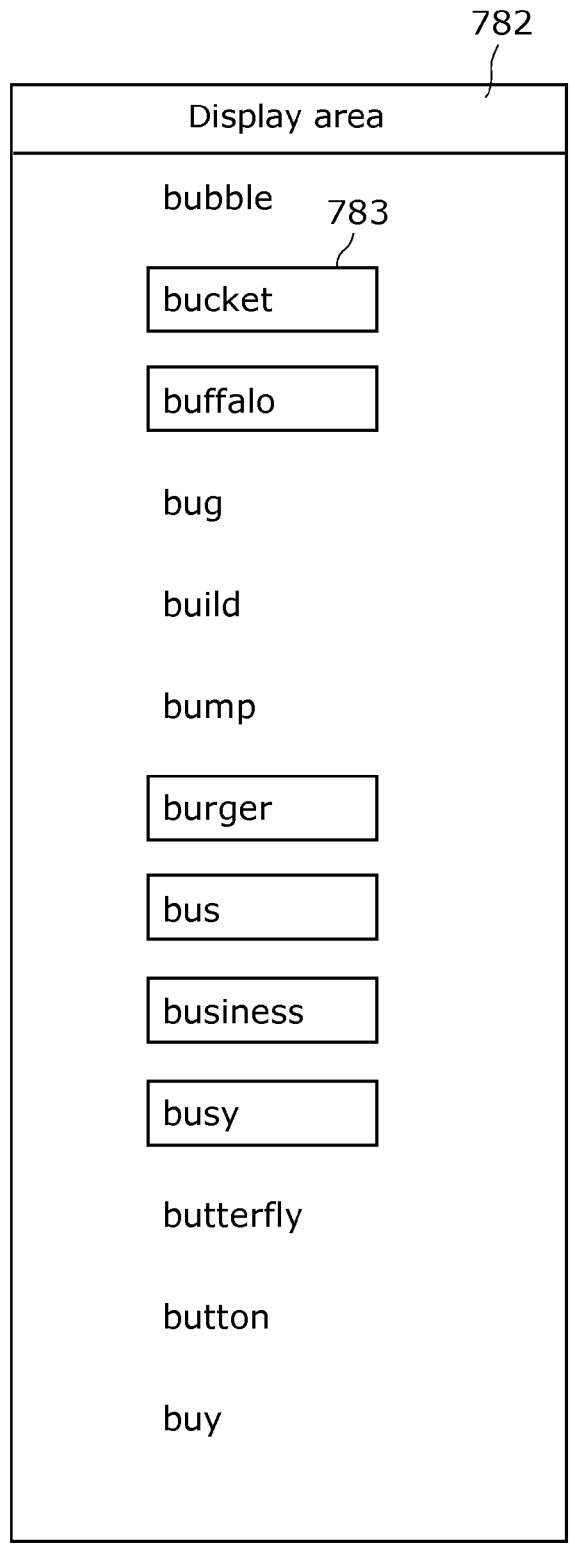
FIG. 33 is a diagram showing an example of the display area according to Embodiment 9 of the present invention.

FIG. 33 is a diagram showing an example of a state where the retrieved character strings are displayed by the output unit 161 in Embodiment 9 of the present invention. A display example after the character range 523 is determined is shown in FIG. 33. The acknowledge display 783 shown in FIG. 33 is used to highlight each predictive character string that includes a predictive character included in the character range 523. Here, each predictive character string that includes any predictive character shown in FIG. 8A following the starting character string "bu" is highlighted. This enables the user to recognize the prediction status appropriately.

As described above, the character input prediction apparatus according to Embodiment 9 of the present invention updates prediction result display or the like only in the case where the prediction result changes significantly, with it being possible to prevent the prediction result display or the like from being frequently updated.

Moreover, the character input prediction apparatus according to Embodiment 9 of the present invention can present the predicted character range 523 to the user through the use of the character range displays 771 and 772.

Furthermore, the character input prediction apparatus according to Embodiment 9 of the present invention can display each predictive character string including a predicted character to the user in highlight mode.

As the character range displays 771 and 772 and the acknowledge display 783, frames, colors, or the like may be used to highlight the corresponding predictive characters or predictive character strings. The display method is not limited to the use of frames or colors, and other methods may be employed.

The character input prediction apparatus may change the display order of the predictive character strings and the other retrieved character strings. For instance, the character input prediction apparatus may display the predictive character strings above the other retrieved character strings.

Moreover, an area for displaying the predictive character strings and an area for displaying the other retrieved character strings may be separately provided.

The character input prediction apparatus may not perform the above-mentioned display control in the case where the number of predictive character strings is less than a predetermined number, and perform the display control in the case where the number of predictive character strings is more than the predetermined number.

The display order of the predictive character strings including the predictive characters may also be adjusted so that character strings nearer the pointer are displayed first.

To effectively display the predictive characters or the predictive character strings, the character input prediction apparatus may display the predictive characters or the predictive character strings only during a period from when the character string input operation starts up to when the character string input operation ends. Moreover, the character input prediction apparatus may update the display of the predictive characters or the predictive character strings, when the predictive characters or the predictive character strings change significantly such as when the movement direction of the pointer changes. This enables the user to easily recognize the predictive characters or the predictive character strings.

In particular, when inputting the first character, the entire character input operation is reflected on the display control of the predictive characters or the predictive character strings. In view of this, the character input prediction apparatus applies such a technique that displays the predictive characters or the predictive character strings upon a state change intended by the user, so as not to make it difficult for the user to recognize the predictive characters or the predictive character strings. In detail, the state change is immediately after the pointer moves away from the starting point, when the pointer position changes significantly, or when the pointer trajectory changes significantly. Depending on the input apparatus, the state change may also be when lifting such as in flicking, when landing, when the sliding changes, upon initial movement, when the speed decreases, when the movement angle of the pointer from the starting point changes, or the like.

Embodiment 10

Embodiments 10 to 12 of the present invention describe the case where there are two indication positions each showing the position of the character input operation.

Figure 34:
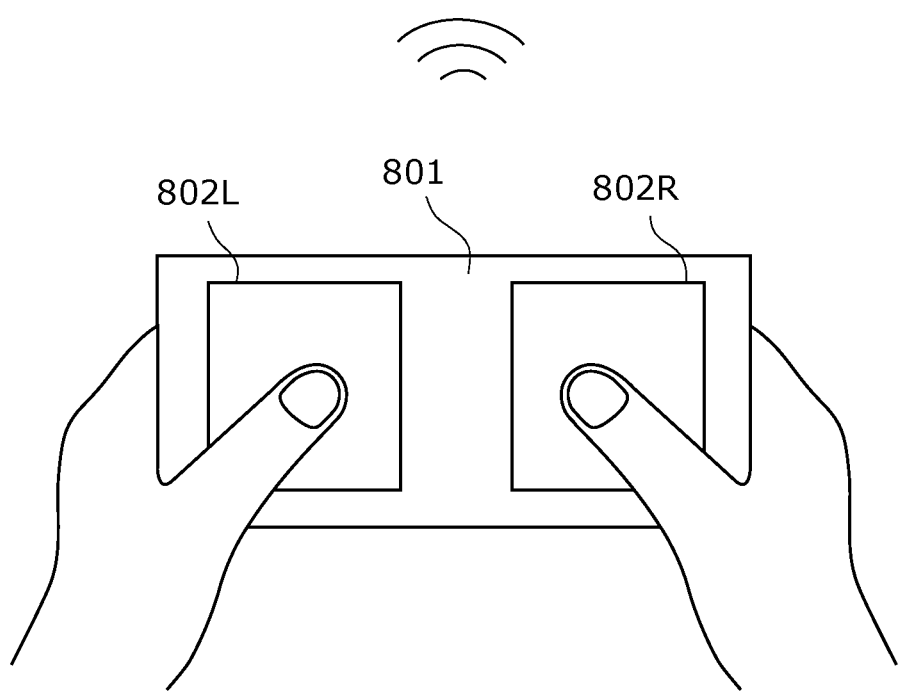
FIG. 34 is a diagram showing an input apparatus according to Embodiment 10 of the present invention.

FIG. 34 is a diagram showing an example of an input apparatus using such two indication positions.

An input apparatus 801 includes two touch sensors (a left touch sensor 802L and a right touch sensor 802R). The two touch sensors are respectively operated with the user's left and right hands. By operating the two touch sensors, the user operates two pointers displayed on the screen. In addition, by pressing the touch sensors, the user selects character keys at the corresponding pointer positions.

Figure 35:
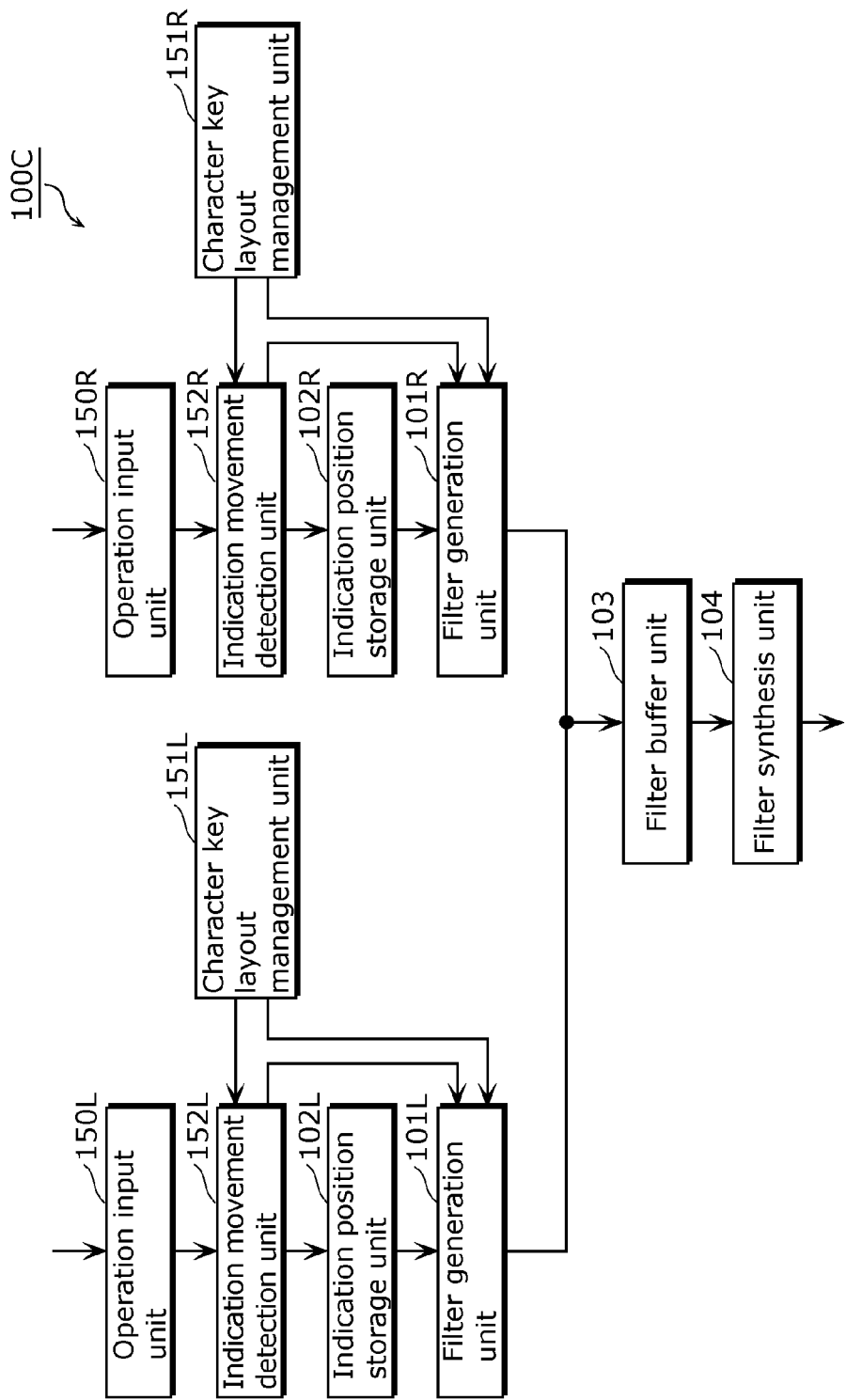
FIG. 35 is a block diagram of a character input prediction apparatus according to Embodiment 10 of the present invention.

FIG. 35 is a block diagram of a character input prediction apparatus 100C according to Embodiment 10 of the present invention.

The character input prediction apparatus 100C includes filter generation units 101L and 101R, indication position storage units 102L and 102R, character key layout management units 151L and 151R, indication movement detection units 152L and 152R, operation input units 150L and 150R, a filter buffer unit 103, and a filter synthesis unit 104. Though not shown, the character input prediction apparatus 100C also includes the character input unit 153, the character string generation unit 154, the dictionary storage unit 155, the dictionary search unit 156, the output character string buffer unit 157, the predictive display condition management unit 158, the predictive control unit 159, the output control unit 160, and the output unit 161, as with the character input prediction apparatus 100A described above.

The filter generation unit 101L, the indication position storage unit 102L, the character key layout management unit 151L, the indication movement detection unit 152L, and the operation input unit 150L are provided for the character input operation on the left side. The filter generation unit 101R, the indication position storage unit 102R, the character key layout management unit 151R, the indication movement detection unit 152R, and the operation input unit 150R are provided for the character input operation on the right side.

The filter generation units 101L and 101R, the indication position storage units 102L and 102R, the character key layout management units 151L and 151R, the indication movement detection units 152L and 152R, and the operation input units 150L and 150R respectively have the same functions as the filter generation unit 101, the indication position storage unit 102, the character key layout management unit 151, the indication movement detection unit 152, and the operation input unit 150 described above.

The filter buffer unit 103 holds the character range 523 predicted by the filter generation unit 101R, in association with the filter generation unit 101R. The filter buffer unit 103 also holds a character range 553 predicted by the filter generation unit 101L, in association with the filter generation unit 101L.

The filter synthesis unit 104 generates one character range 583 predicted to be operated by the user, using the character ranges 523 and 553 held in the filter buffer unit 103. In detail, the filter synthesis unit 104 generates a range that is included in both of the character ranges 523 and 553, as the character range 583. The character range 583 is provided to the predictive display condition management unit 158, to perform the same process as in the other embodiments described above.

Figures 36A, 36B, 36C:
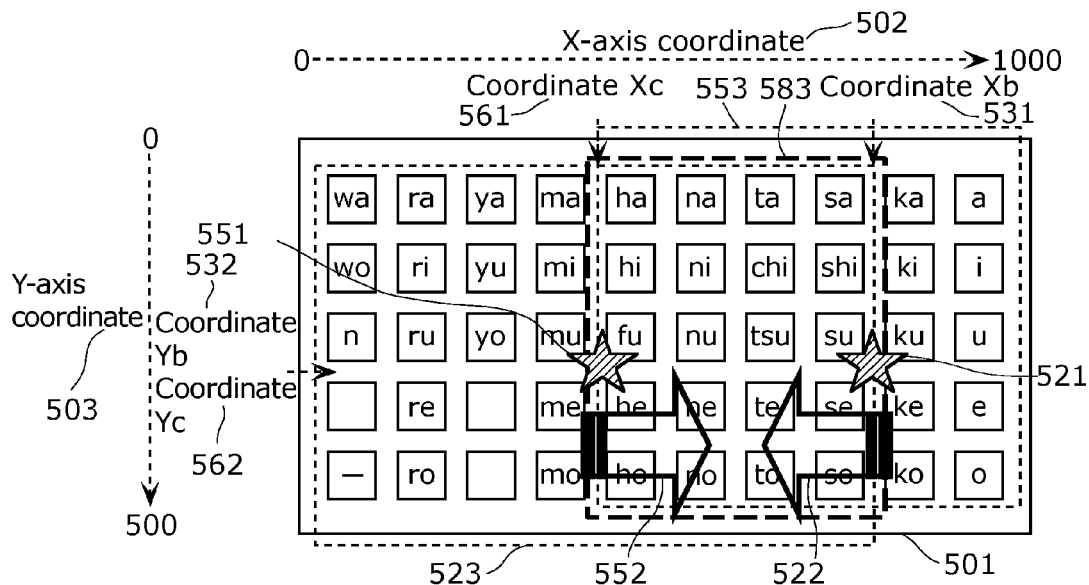
FIG. 36A is a diagram showing an operation example of the character input prediction apparatus according to Embodiment 10 of the present invention.
FIG. 36B is a diagram showing an example of an indication position according to Embodiment 10 of the present invention.
FIG. 36C is a diagram showing an example of an indication position according to Embodiment 10 of the present invention.

FIG. 36A is a diagram showing an example of a character input operation situation using the character key layout display 501 in Embodiment 10 of the present invention.

An indication position 551 shows the position of the other character input operation by the user, and moves according to the input operation by the user.

An indication direction 552 shows the movement direction of the indication position 551.

The character range 553 shows a range of characters predicted in relation to the indication position 551.

A coordinate Xc 561 shows an X-axis coordinate of the indication position 551. A coordinate Yc 562 shows a Y-axis coordinate of the indication position 551.

FIG. 36B is a diagram showing a specific numerical example of the indication position 521 in Embodiment 10 of the present invention. FIG. 36C is a diagram showing a specific numerical example of the indication position 551 in Embodiment 10 of the present invention.

The following describes a specific example of the operation of the character input prediction apparatus 100C according to Embodiment 10 of the present invention.

In the example shown in FIGS. 36A to 36C, the coordinate Xb 531 and the coordinate Yb 532 of the indication position 521 are respectively "800" and "300", and the indication direction 522 is "horizontally left".

Since the indication direction 402 is the horizontally left 421, the character range condition 403 is "(0, 0):(coordinate Xb 411, 500)". The filter generation unit 101R substitutes the coordinate Xb 531 (=800) for the coordinate Xb 411, thereby obtaining the character range condition 403 "(0, 0):(800, 500)".

The filter generation unit 101R then determines the character range 523. In detail, the filter generation unit 101R determines, for each character 302, whether or not the character 302 is within a range of the character range condition 403 "(0, 0):(800, 500)", using the character range condition 403 "(0, 0):(800, 500)" and the layout position 303 in the character key layout 301.

The resulting character range 523 is "sa, shi, su, se, so, ta, chi, tsu, te, to, na, ni, nu, ne, no, ha, hi, fu, he, ho, ma, mi, mu, me, mo, ya, yu, yo, ra, ri, ru, re, ro, wa, wo, n, -". The character range 523 is held in the filter buffer unit 103.

Meanwhile, the coordinate Xc 561 and the coordinate Yc 562 of the indication position 551 are respectively "400" and "300", and the indication direction 552 is "horizontally right".

Since the indication direction 402 is horizontally right 423, the character range condition 403 is "(coordinate Xb 411, 0):(1000, 500)". The filter generation unit 101L substitutes the coordinate Xc 561 (=400) for the coordinate Xb 411, thereby obtaining the character range condition 403 "(400, 0):(1000, 500)".

The filter generation unit 101L then determines the character range 553. In detail, the filter generation unit 101L determines, for each character 302, whether or not the character 302 is within a range of the character range condition 403 "(400, 0):(1000, 500)", using the character range condition 403 "(400, 0):(1000, 500)" and the layout position 303 in the character key layout 301.

The resulting character range 553 is "a, i, u, e, o, ka, ki, ku, ke, ko, sa, shi, su, se, so, ta, chi, tsu, te, to, na, ni, nu, ne, no, ha, hi, fu, he, ho". The character range 553 is held in the filter buffer unit 103.

Next, the filter synthesis unit 104 generates the character range 583 of the characters "sa, shi, su, se, so, ta, chi, tsu, te, to, na, ni, nu, ne, no, ha, hi, fu, he, ho" commonly included in the character range 523 "sa, shi, su, se, so, ta, chi, tsu, te, to, na, ni, nu, ne, no, ha, hi, fu, he, ho, ma, mi, mu, me, mo, ya, yu, yo, ra, ri, ru, re, ro, wa, wo, n, -" and the character range 553 "a, i, u, e, o, ka, ki, ku, ke, ko, sa, shi, su, se, so, ta, chi, tsu, te, to, na, ni, nu, ne, no, ha, hi, fu, he, ho".

As described above, the character input prediction apparatus according to Embodiment 10 of the present invention can narrow down predictive character strings at high speed in the case of using two character input operations.

Though the above describes the case where the character key layout management units 151L and 151R are separately provided for the two character input operations, one character key layout management unit may be commonly used for the two character input operations.

Embodiment 11

Embodiment 11 of the present invention describes a method of determining the character range 583 in the case where only one of the two indication positions 521 and 551 moves.

The character input prediction apparatus according to Embodiment 11 of the present invention has, for example, the same structure as shown in FIG. 35.

FIG. 37A is a diagram showing an example of a character input operation situation using the character key layout display 501 in Embodiment 11 of the present invention. FIG. 37B is a diagram showing a specific numerical example of the indication position 521 in Embodiment 11 of the present invention. FIG. 37C is a diagram showing a specific numerical example of the indication position 551 in Embodiment 11 of the present invention.

A time lapse 571 shows time progress of the character input operation.

The filter synthesis unit 104 determines, in the case where only one of the indication positions 521 and 551 changes, the character range 583 using: the character range calculated from the changing indication position and the indication direction; and the other indication position.

Consider the case where the indication position 521 changes while the indication position 551 is unchanged. The filter synthesis unit 104 determines the character range 583 using the character range 523 and the indication position 551. In detail, in the case where the indication position 521 moves toward the indication position 551, the filter synthesis unit 104 determines a range that is included in the character range 523 and is located in a direction toward the indication position 521 with the indication position 551 as the base point, as the character range 583.

In more detail, the filter generation unit 101R predicts the character range 523 using the character key layout 301 held in the character key layout management unit 151R and a plurality of indication positions 521 held in the indication position storage unit 102R, and holds the character range 523 in association with the plurality of indication positions 521.

The indication position storage unit 102L holds a plurality of indication positions 551 notified from the indication movement detection unit 152L.

The filter generation unit 101L predicts the character range 553 using the character key layout 301 held in the character key layout management unit 151L and the plurality of indication positions 551 held in the indication position storage unit 102L, and holds the character range 553 in association with the plurality of indication positions 551.

The filter buffer unit 103 holds the most recent indication position 521 from among the plurality of indication positions 521 associated with the character range 523 predicted by the filter generation unit 101R, as a guidance position.

Alternatively, the filter buffer unit 103 holds the most recent indication position 551 from among the plurality of indication positions 551 associated with the character range 553 predicted by the filter generation unit 101L, as the guidance position.

The indication movement detection unit 152R or 152L generates, in the case where the guidance position is position information from the other side, the indication direction using the guidance position and any of the plurality of indication positions.

Alternatively, the indication movement detection unit 152R or 152L generates, in the case where the guidance position is position information from the other side, the new indication position and indication direction using the guidance position and a positional relation that uses any of the plurality of indication positions.

The filter generation unit 101R or 101L predicts the character range, using the new indication position and indication direction received from the indication movement detection unit.

The following describes a specific example of the operation of the character input prediction apparatus according to Embodiment 11 of the present invention.

In the example shown in FIGS. 37A to 37C, the coordinate Xb 531 and the coordinate Yb 532 of the indication position 521 when the time lapse 541 is "1" are respectively "900" and "300". The coordinate Xb 531 and the coordinate Yb 532 of the indication position 521 when the time lapse 541 is "2" are respectively "850" and "300". The coordinate Xb 531 and the coordinate Yb 532 of the indication position 521 when the time lapse 541 is "3" are respectively "800" and "300".

That is, the coordinate Xb 531 changes from "900" to "800" while the coordinate Yb 532 remains unchanged at "300", during the period of the time lapse 541 from "1" to "3". Accordingly, the indication direction 522 is "horizontally left".

Since the indication direction 402 is the horizontally left 421, the character range condition 403 is "(0, 0):(coordinate Xb 411, 500)". The filter generation unit 101R substitutes the coordinate Xb 531 (=800) for the coordinate Xb 411, thereby obtaining the character range condition 403 "(0, 0):(800, 500)".

The filter generation unit 101R then determines the character range 523. In detail, the filter generation unit 101R determines, for each character 302, whether or not the character 302 is within a range of the character range condition 403 "(0, 0):(800, 500)", using the character range condition 403 "(0, 0):(800, 500)" and the layout position 303 in the character key layout 301.

The resulting character range 523 is "sa, shi, su, se, so, ta, chi, tsu, te, to, na, ni, nu, ne, no, ha, hi, fu, he, ho, ma, mi, mu, me, mo, ya, yu, yo, ra, ri, ru, re, ro, wa, wo, n, -". The character range 523 is held in the filter buffer unit 103.

Meanwhile, only the indication position 551 when the time lapse 571 is "1" is held in the indication position storage unit 102L, and so it is impossible to determine the movement direction of the indication position 551. This means the indication position 551 is stopped. Therefore, the guidance position is the coordinate Xb 531 "800" and the coordinate Yb 532 "300" of the most recent indication position 521 (when the time lapse 541 is "3").

The indication movement detection unit 152L determines that the indication direction 552 is "horizontally right", using the coordinate Xc 561 "400" and the coordinate Yc 562 "300" of the indication position 551 (when the time lapse 571 is "1") and the coordinate X "800" and the coordinate Y "300" of the guidance position.

Since the indication direction 402 is the horizontally right 423, the character range condition 403 is "(coordinate Xb 411, 0):(1000, 500)". The filter generation unit 101L substitutes the coordinate Xc 561 (=400) for the coordinate Xb 411, thereby obtaining the character range condition 403 "(400, 0):(1000, 500)".

The filter generation unit 101L then determines the character range 553. In detail, the filter generation unit 101L determines, for each character 302, whether or not the character 302 is within a range of the character range condition 403 "(400, 0):(1000, 500)", using the character range condition 403 "(400, 0):(1000, 500)" and the layout position 303 in the character key layout 301.

The resulting character range 553 is "a, i, u, e, o, ka, ki, ku, ke, ko, sa, shi, su, se, so, ta, chi, tsu, te, to, na, ni, nu, ne, no, ha, hi, fu, he, ho". The character range 553 is held in the filter buffer unit 103.

Next, the filter synthesis unit 104 generates the character range 583 of the characters "sa, shi, su, se, so, ta, chi, tsu, te, to, na, ni, nu, ne, no, ha, hi, fu, he, ho" commonly included in the character range 523 "sa, shi, su, se, so, ta, chi, tsu, te, to, na, ni, nu, ne, no, ha, hi, fu, he, ho, ma, mi, mu, me, mo, ya, yu, yo, ra, ri, ru, re, ro, wa, wo, n, -" and the character range 553 "a, i, u, e, o, ka, ki, ku, ke, ko, sa, shi, su, se, so, ta, chi, tsu, te, to, na, ni, nu, ne, no, ha, hi, fu, he, ho".

Though the above describes the case where one of the indication positions 521 and 551 is stopped, the same process may be performed in the case where the movement amount or the movement speed of one of the indication positions 521 and 551 is equal to or less than a predetermined value.

As described above, the character input prediction apparatus according to Embodiment 11 of the present invention can determine the more appropriate character range in the case where the position of only one of the two character input operations moves.

Embodiment 12

Embodiment 12 of the present invention describes a different method of determining the character range 583 in the case where only one of the two indication positions 521 and 551 moves, from Embodiment 11 of the present invention.

Figures 38A, 38B, 38C:
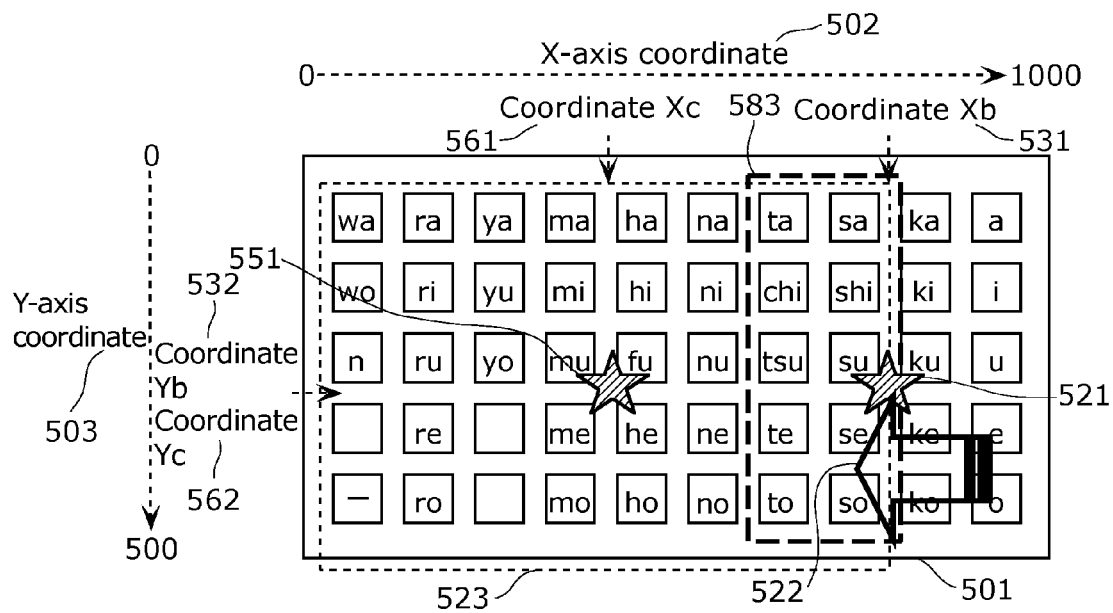
FIG. 38A is a diagram showing an operation example of a character input prediction apparatus according to Embodiment 12 of the present invention.
FIG. 38B is a diagram showing an example of an indication position according to Embodiment 12 of the present invention.
FIG. 38C is a diagram showing an example of an indication position according to Embodiment 12 of the present invention.

FIG. 38A is a diagram showing an example of a character input operation situation using the character key layout display 501 in Embodiment 12 of the present invention. FIG. 38B is a diagram showing a specific numerical example of the indication position 521 in Embodiment 12 of the present invention. FIG. 38C is a diagram showing a specific numerical example of the indication position 551 in Embodiment 12 of the present invention.

The filter synthesis unit 104 determines, in the case where only one of the indication positions 521 and 551 changes, the character range 583 using: the character range calculated from the changing indication position and the indication direction; and the other indication position.

Consider the case where the indication position 521 changes while the indication position 551 is unchanged. The filter synthesis unit 104 determines the character range 583 using the character range 523 and the indication position 551. In detail, in the case where the indication position 521 moves toward the indication position 551, the filter synthesis unit 104 determines a range that is included in the character range 523 and is located in a direction toward the indication position 521 from a reference point, as the character range 583. The reference point mentioned here is a point between the indication positions 551 and 521. For instance, the reference point is a midpoint between the indication positions 551 and 521. As an alternative, the reference point may be a point at a first distance from one of the indication positions 551 and 521 toward the other one of the indication positions 551 and 521. The first distance may be a predetermined value, or a value that varies depending on a distance between the indication positions 551 and 521.

As described above, the character input prediction apparatus according to Embodiment 12 of the present invention can determine the more appropriate character range in the case where the position of only one of the two character input operations moves.

Embodiment 13

Embodiment 13 of the present invention describes the case where the two indication positions move away from each other. In detail, the filter synthesis unit 104 determines, as the character range 583, one of the character ranges 523 and 553 that corresponds to a faster indication speed, in the case where there is no common character to the character ranges 523 and 553.

FIG. 39A is a diagram showing an example of a character input operation situation using the character key layout display 501 in Embodiment 13 of the present invention. FIG. 39B is a diagram showing a specific numerical example of the indication position 521 in Embodiment 13 of the present invention. FIG. 39C is a diagram showing a specific numerical example of the indication position 551 in Embodiment 13 of the present invention.

The following describes a specific example of the operation of the character input prediction apparatus according to Embodiment 13 of the present invention.

In the example shown in FIGS. 39A to 39C, the coordinate Xb 531 and the coordinate Yb 532 of the most recent indication position 521 are respectively "800" and "300", and the indication direction 522 is "horizontally right".

Since the indication direction 402 is the horizontally right 423, the character range condition 403 is "(coordinate Xb 411, 0):(1000, 500)". The filter generation unit 101R substitutes the coordinate Xb 531 (=800) for the coordinate Xb 411, thereby obtaining the character range condition 403 "(800, 0):(1000, 500)".

The filter generation unit 101R then determines the character range 523. In detail, the filter generation unit 101R determines, for each character 302, whether or not the character 302 is within a range of the character range condition 403 "(800, 0):(1000, 500)", using the character range condition 403 "(800, 0):(1000, 500)" and the layout position 303 in the character key layout 301.

The resulting character range 523 is "a, i, u, e, o, ka, ki, ku, ke, ko". The character range 523 is held in the filter buffer unit 103.

Meanwhile, the coordinate Xc 561 and the coordinate Yc 562 of the most recent indication position 551 are respectively "400" and "300", and the indication direction 552 is the horizontally left 421.

Since the indication direction 402 is the horizontally left 421, the character range condition 403 is "(0, 0):(coordinate Xb 411, 500)". The filter generation unit 101L substitutes the coordinate Xc 561 (=400) for the coordinate Xb 411, thereby obtaining the character range condition 403 "(0, 0):(400, 500)".

The filter generation unit 101L then determines the character range 553. In detail, the filter generation unit 101L determines, for each character 302, whether or not the character 302 is within a range of the character range condition 403 "(0, 0):(400, 500)", using the character range condition 403 "(0, 0):(400, 500)" and the layout position 303 in the character key layout 301.

The resulting character range 553 is "ma, mi, mu, me, mo, ya, yu, yo, ra, ri, ru, re, ro, wa, wo, n, -". The character range 553 is held in the filter buffer unit 103.

Next, the filter synthesis unit 104 determines whether or not there is a common character included in the character ranges 523 and 553 held in the filter buffer unit 103. Since no common character can be found, the filter synthesis unit 104 selects one of the character ranges 523 and 553, according to the movement amounts of the indication positions 521 and 551 respectively associated with the character ranges 523 and 553.

In detail, the coordinate Xb 531 and the coordinate Yb 532 of the indication position 521 when the time lapse 541 is "1" are respectively "600" and "300". The coordinate Xb 531 and the coordinate Yb 532 of the indication position 521 when the time lapse 541 is "2" are respectively "700" and "300". The coordinate Xb 531 and the coordinate Yb 532 of the indication position 521 when the time lapse 541 is "3" are respectively "800" and "300". Accordingly, the change of the coordinate Xb 531 during the period of the time lapse 541 from "1" to "3" is "200".

On the other hand, the coordinate Xc 561 and the coordinate Yc 562 of the indication position 551 when the time lapse 571 is "1" are respectively "500" and "300". The coordinate Xc 561 and the coordinate Yc 562 of the indication position 551 when the time lapse 571 is "2" are respectively "450" and "300". The coordinate Xc 561 and the coordinate Yc 562 of the indication position 551 when the time lapse 571 is "3" are respectively "400" and "300". Accordingly, the change of the coordinate Xc 561 during the period of the time lapse 571 from "1" to "3" is "100".

The filter synthesis unit 104 compares the calculated changes of the indication positions 521 and 551 with each other, and determines the indication position with the larger change to be in the operation direction of the user.

As a result, the filter synthesis unit 104 selects the character range 523 "a, i, u, e, o, ka, ki, ku, ke, ko" corresponding to the larger change, as the character range 583.

As described above, the character input prediction apparatus according to Embodiment 13 of the present invention can determine the more appropriate character range in the case where the positions of the two character input operations move away from each other.

Though the above describes the case where the filter synthesis unit 104 is provided to adapt to a plurality of characters or a plurality of input apparatuses, the filter generation unit 101 may directly provide the filter information to the predictive display condition management unit 158.

Though the character input prediction apparatus according to each of the embodiments of the present invention has been described above, the present invention is not limited to these embodiments.

The processing units included in the character input prediction apparatus described in each of the above embodiments may be typically realized as LSI which is an integrated circuit. These processing units may each be individually implemented as one chip, or may be partly or wholly implemented on one chip.

The integrated circuit method is not limited to LSI, and may be realized by a dedicated circuit or a general-purpose processor. An FPGA (Field Programmable Gate Array) that can be programmed after LSI manufacturing or a reconfigurable processor capable of reconfiguring connections and settings of circuit cells in LSI may also be used.

The functions of the character input prediction apparatus according to each of the embodiments of the present invention may be partly or wholly realized by a processor such as a CPU executing a program.

The present invention may be the program, or a non-transitory computer-readable recording medium on which the program is recorded. The program may be distributed via a transmission medium such as the Internet.

In each of the above embodiments, each component may be realized by dedicated hardware or execution of a suitable software program. Each component may also be realized by a program execution unit such as a CPU or a processor reading and executing a software program recorded on a recording medium such as a hard disk or a semiconductor memory. Software for implementing the character input prediction apparatus and the like in each of the above embodiments is the following program.

The program causes a computer to execute: obtaining information of a first character input operation that is performed by a user using a character key layout display in which a plurality of character keys are arranged; detecting an indication position and an indication direction in the character key layout display from the information of the first character input operation, the indication position showing a position of the first character input operation, and the indication direction showing a movement direction of the first character input operation; determining a character range in the character key layout display using the indication position, the indication direction, and a character key layout showing an arrangement of a plurality of character keys in the character key layout display, the character range being located in the indication direction with the indication position as a base point; and searching a plurality of candidate character strings included in a dictionary, for a predictive character string that includes any character included in the first character range.

At least a part of the functions of the character input prediction apparatus according to Embodiments 1 to 13 and their variations described above may be combined.

All numbers used above are illustrative for detailed description of the present invention, and the present invention is not limited to these numbers.

The division of the functional blocks in each block diagram is an example, and a plurality of functional blocks may be realized as one functional block, one functional block may be divided into a plurality of functional blocks, or a part of functions may be transferred to another functional block. Moreover, functions of a plurality of functional blocks having similar functions may be realized by single hardware or software in parallel or in a time-sharing manner.

The procedure in each flowchart is an example, and another procedure for achieving the same result may instead be used. For instance, the steps may be executed in order other than the above-mentioned order. Besides, a part of the steps may be executed simultaneously (in parallel) with other steps.

Variations obtained by applying changes conceivable by those skilled in the art to the embodiments are also included in the present invention without departing from the scope of the present invention.

INDUSTRIAL APPLICABILITY

The present invention is applicable to a character input prediction apparatus. An input apparatus using a character input prediction apparatus according to the present invention exhibits improved character input efficiency and is easily usable by anyone regardless of IT literacy, and therefore is useful for a smartphone, an e-book reader, or the like. The present invention is also applicable to an existing input apparatus such as arrow keys.

REFERENCE SIGNS LIST 100, 100A, 100B, 100C, 900 Character input prediction apparatus
101, 101L, 101R Filter generation unit
102, 102L, 102R Indication position storage unit
103 Filter buffer unit
104 Filter synthesis unit
150, 150L, 150R Operation input unit
151, 151L, 151R Character key layout management unit
152, 152L, 152R Indication movement detection unit
153, 953 Character input unit
154, 954 Character string generation unit
155, 955 Dictionary storage unit
156, 956 Dictionary search unit
157, 957 Output character string buffer unit
158 Predictive display condition management unit
159 Predictive control unit
160 Output control unit
161, 961 Output unit
170 Dictionary
301 Character key layout
302, 921 Character
303 Layout position
304 Start position
305 End position
341, 351 X-axis coordinate
342, 352 Y-axis coordinate
401, 401A, 401B, 401C, 401D Character range definition
402, 402A Indication direction
403 Character range condition
404 Start position
405 End position
406 Angle range
407 Reference range
408 Deletion range
411 Coordinate Xb
412 Coordinate Yb
421 Horizontally left
422 Vertically up
423 Horizontally right
424 Diagonally down left
501 Character key layout display
502 X-axis coordinate
503 Y-axis coordinate
521, 551 Indication position
522, 552 Indication direction
523, 523A, 523B, 553, 583 Character range
531 Coordinate Xb
532 Coordinate Yb
533 Indication angle
541, 571, 741 Time lapse
561 Coordinate Xc
562 Coordinate Yc
721 Indication starting point
731 Coordinate Xa
732 Coordinate Ya
751 Input character position
761 Coordinate Xm
762 Coordinate Ym
771, 772 Character range display
781 Character string
782 Display area
783 Acknowledge display
801 Input apparatus
802L Left touch sensor
802R Right touch sensor

The invention claimed is:
1. A character input prediction apparatus comprising:
a first operation input unit configured to obtain information of a first character input operation that is performed by a user using a character key layout display in which a plurality of character keys are arranged;

a dictionary storage unit configured to store a dictionary including a plurality of candidate character strings;

a character key layout management unit configured to store a character key layout showing the arrangement of the plurality of character keys in the character key layout display;

a first indication movement detection unit configured to detect a first indication position and a first indication direction in the character key layout display from the information of the first character input operation, the first indication position showing a position of the first character input operation, and the first indication direction showing a movement direction of the first character input operation;

a first filter generation unit configured to determine a vector having the first indication position as a base point using the first indication position and the first indication direction, and determine a first character range using the character key layout, the first character range including a plurality of character keys located in an extending direction of the vector; and a dictionary search unit configured to search the plurality of candidate character strings included in the dictionary, for a predictive character string that includes a character corresponding to any one of the plurality of character keys included in the first character range.

2. The character input prediction apparatus according to claim 1, further comprising:

a character input unit configured to obtain information of an input character inputted by the first character input operation; and a character string generation unit configured to generate an input character string by arranging the input character in input order, wherein the dictionary search unit is configured to search the plurality of candidate character strings included in the dictionary, for the predictive character string that starts with a character string generated by adding, immediately following the input character string, any character included in the first character range.

3. The character input prediction apparatus according to claim 2, further comprising an indication position storage unit configured to hold an indication starting point, wherein the first indication movement detection unit is configured to: detect the first indication position at predetermined time intervals; in the case where the indication starting point is not held in the indication position storage unit, cause the indication position storage unit to hold the detected first indication position as the indication starting point; and detect, as the movement direction, a direction of a newly detected first indication position with the indication starting point as a starting point.

4. The character input prediction apparatus according to claim 3, wherein the first indication movement detection unit is configured to, in the case where the input character is inputted by the first character input operation, cause the indication position storage unit to hold a position of a character key corresponding to the input character, as the indication starting point.

5. The character input prediction apparatus according to claim 3, wherein the first filter generation unit is configured to, in the case where the position of the first character input operation moves from the indication starting point to the first indication position that is located in a first direction relative to the indication starting point and then moves from the first indication position to a second indication position that is located in a second direction relative to the first indication position, determine a range between the indication starting point and the second indication position as the first character range, the second direction being opposite to the first direction.

6. The character input prediction apparatus according to claim 1, wherein the first operation input unit is configured to obtain the information of the first character input operation performed via an input apparatus that limits the movement direction of the character input operation to a vertical direction and a horizontal direction.

7. The character input prediction apparatus according to claim 1, wherein the first indication movement detection unit is configured to detect the first indication position at predetermined time intervals, the character input prediction apparatus further comprises an indication position storage unit configured to hold a plurality of indication positions detected by the first indication movement detection unit, and the first indication movement detection unit is configured to calculate the first indication direction using the plurality of indication positions held in the indication position storage unit.

8. The character input prediction apparatus according to claim 1, wherein the first indication movement detection unit is configured to detect the first indication position at predetermined time intervals, the character input prediction apparatus further comprises an indication position storage unit configured to hold a plurality of indication positions detected by the first indication movement detection unit, the first indication movement detection unit is further configured to calculate a movement speed of the first character input operation, from the plurality of indication positions, and the first filter generation unit is configured to: in the case where the movement speed is equal to or more than a first speed, determine a first range in the character key layout display as the first character range; and in the case where the movement speed is less than the first speed, determine a second range in the character key layout display as the first character range, the first range being located in the first indication direction with the first indication position as the base point, and the second range being located in the first indication direction with the first indication position as the base point and being smaller than the first range.

9. The character input prediction apparatus according to claim 1, wherein the first indication movement detection unit is configured to detect the first indication position at predetermined time intervals, the character input prediction apparatus further comprises an indication position storage unit configured to hold a plurality of indication positions detected by the first indication movement detection unit, the first indication movement detection unit is further configured to calculate a movement speed of the first character input operation, from the plurality of indication positions, and the first filter generation unit is configured to: in the case where the movement speed is less than a second speed, determine a first range in the character key layout display as the first character range; and in the case where the movement speed is equal to or more than the second speed, determine a second range as the first character range, the first range being located in the first indication direction with the first indication position as the base point, and the second range being obtained by excluding, from the first range, a range that is included in the first range and is nearer the first indication position.

10. The character input prediction apparatus according to claim 1,
wherein the first indication movement detection unit is configured to calculate an indication angle which is a movement angle of the first character input operation, the indication angle being obtained by classifying an angle of the first indication direction, and
the first filter generation unit is configured to determine the first character range by excluding, from a reference range set for the first indication direction, a deletion range set for the indication angle.

11. The character input prediction apparatus according to claim 1, further comprising:
a second operation input unit configured to obtain information of a second character input operation that is performed by the user using the character key layout display;
a second indication movement detection unit configured to detect a second indication position and a second indication direction in the character key layout display from the information of the second character input operation, the second indication position showing a position of the second character input operation, and the second indication direction showing a movement direction of the second character input operation;
a second filter generation unit configured to determine a second character range in the character key layout display using the second indication position, the second indication direction, and the character key layout, the second character range being located in the second indication direction with the second indication position as the base point; and
a filter synthesis unit configured to extract a third character range that is included in both the first character range and the second character range,
wherein the dictionary search unit is configured to search the plurality of candidate character strings included in the dictionary, for the predictive character string that includes any character included in the third character range.

12. The character input prediction apparatus according to claim 11,
wherein the filter synthesis unit is further configured to determine, as the third character range, a range that is included in the first character range and is located in a direction toward the first indication position with the second indication position as the base point, in the case where the position of the first character input operation moves and a movement amount of the position of the second character input operation is equal to or less than a predetermined threshold.

13. The character input prediction apparatus according to claim 11,
wherein the filter synthesis unit is further configured to determine, as the third character range, a range that is included in the first character range and is located in a direction toward the first indication position with a reference point as the base point, in the case where the position of the first character input operation moves and a movement amount of the position of the second character input operation is equal to or less than a predetermined threshold, and
the reference point is a point between the first indication position and the second indication position.

14. The character input prediction apparatus according to claim 11,
wherein the filter synthesis unit is further configured to: determine the first character range as the third character range in the case where the position of the first character input operation has a larger movement amount than the position of the second character input operation; and determine the second character range as the third character range in the case where the position of the second character input operation has a larger movement amount than the position of the first character input operation.

15. The character input prediction apparatus according to claim 1,
wherein the first filter generation unit is configured to: determine the first character range at predetermined time intervals, and determine a change between the first character range previously determined and the first character range newly determined; and update the first character range to the newly determined first character range in the case where the change is equal to or more than a predetermined threshold, and
the dictionary search unit is configured to search the plurality of candidate character strings included in the dictionary, for the predictive character string that includes any character included in the updated first character range.

16. The character input prediction apparatus according to claim 15, displaying the first character range on the character key layout display.

17. The character input prediction apparatus according to claim 15, displaying the predictive character string that includes any character included in the first character range and is searched for by the dictionary search unit.

18. A character input prediction method comprising:
obtaining information of a first character input operation that is performed by a user using a character key layout display in which a plurality of character keys are arranged;
detecting an indication position and an indication direction in the character key layout display from the information of the first character input operation, the indication position showing a position of the first character input operation, and the indication direction showing a movement direction of the first character input operation;
determining a vector having the indication position as a base point using the indication position and the indication direction, a character key layout showing an arrangement of a plurality of character keys in the character key layout display, and determining a character range using the character key layout, the character range including a plurality of character keys located in an extending direction of the vector; and
searching a plurality of candidate character strings included in a dictionary, for a predictive character string that includes a character corresponding to any one of the plurality of character keys included in the character range.

19. A non-transitory computer-readable recording medium for use in a computer, the recording medium having a program of the character input prediction method according to claim 18 recorded thereon.

20. An integrated circuit comprising:

a first operation input unit configured to obtain information of a first character input operation that is performed by a user using a character key layout display in which a plurality of character keys are arranged;

a dictionary storage unit configured to store a dictionary including a plurality of candidate character strings;

a character key layout management unit configured to store a character key layout showing the arrangement of the plurality of character keys in the character key layout display;

a first indication movement detection unit configured to detect a first indication position and a first indication direction in the character key layout display from the information of the first character input operation, the first indication position showing a position of the first character input operation, and the first indication direction showing a movement direction of the first character input operation;

a filter generation unit configured to determine a vector having the first indication position as a base point using the first indication position and the first indication direction, and determine a first character range using the character key layout, the first character range including a plurality of character keys located in an extending direction of the vector; and a dictionary search unit configured to search the plurality of candidate character strings included in the dictionary, for a predictive character string that includes a character corresponding to any one of the plurality of character keys included in the first character range.

21. A character input system comprising:

the character input prediction apparatus according to claim 1; and an input apparatus that receives the first character input operation.

* * * * *